United States Patent
Guo et al.

(10) Patent No.: US 10,830,651 B2
(45) Date of Patent: Nov. 10, 2020

(54) THERMOSTAT MONITORING SYSTEM AND METHOD

(71) Applicant: Nissan North America, Inc., Franklin, TN (US)

(72) Inventors: Yichao Guo, Rochester Hills, MI (US); Eugene Danquah, Farmington Hills, MI (US); Wei Lu, Novi, MI (US); Janean Kowalkowski, Northville, MI (US); Brent Crary, Ann Arbor, MI (US)

(73) Assignee: Nissan North America, Inc., Franklin, TN (US)

( * ) Notice: Subject to any disclaimer, the term of this patent is extended or adjusted under 35 U.S.C. 154(b) by 173 days.

(21) Appl. No.: 15/611,308

(22) Filed: Jun. 1, 2017

(65) Prior Publication Data
US 2018/0348071 A1    Dec. 6, 2018

(51) Int. Cl.
*G01K 15/00* (2006.01)
*F01P 11/16* (2006.01)
*G01K 13/02* (2006.01)

(52) U.S. Cl.
CPC .......... *G01K 15/007* (2013.01); *F01P 11/16* (2013.01); *G01K 13/02* (2013.01); *F01P 2025/62* (2013.01); *F01P 2025/66* (2013.01); *G01K 2013/026* (2013.01); *G01K 2205/00* (2013.01)

(58) Field of Classification Search
CPC .. G01K 15/007; G01K 13/02; G01K 2205/00; G01K 2013/026; F01P 11/16; F01P 2025/66; F01P 2025/62
See application file for complete search history.

(56) References Cited

U.S. PATENT DOCUMENTS

| | | | |
|---|---|---|---|
| 6,283,381 B1 * | 9/2001 | Uchiyama | F01P 11/16 123/41.15 |
| 7,137,295 B2 | 11/2006 | Wakahara et al. | |
| 2003/0110848 A1 | 6/2003 | Matsumoto et al. | |
| 2009/0281690 A1 * | 11/2009 | Sasaki | G06F 11/1441 701/33.4 |

(Continued)

FOREIGN PATENT DOCUMENTS

WO    2011039591 A1    4/2011

*Primary Examiner* — Genna M Mott
(74) *Attorney, Agent, or Firm* — Global IP Counsels, LLP

(57) ABSTRACT

A thermostat monitoring method includes measuring an engine coolant temperature with an engine coolant temperature sensor a predetermined amount of time after engine startup, comparing, with a controller, the engine coolant temperature to determine whether the engine coolant temperature has met a predetermined threshold, when the engine coolant temperature has met the predetermined threshold, measuring a plurality of engine coolant temperatures with the engine coolant temperature sensor, comparing with the controller each of the plurality of engine coolant temperatures with a corresponding predetermined temperature model, and increasing a passing index with the controller for each of the plurality of engine coolant temperatures that is greater than the corresponding predetermined temperature model or reducing the passing index for each of the plurality of engine coolant temperatures that is less than the corresponding predetermined temperature model.

12 Claims, 19 Drawing Sheets

(56) References Cited

U.S. PATENT DOCUMENTS

| | | | |
|---|---|---|---|
| 2011/0264323 A1* | 10/2011 | Sakakibara | B60R 16/0232 701/31.4 |
| 2012/0106590 A1 | 5/2012 | Suzuki | |
| 2014/0023107 A1* | 1/2014 | Furuta | G01N 25/72 374/4 |
| 2014/0123918 A1* | 5/2014 | Nethercutt | F01P 7/16 123/41.08 |
| 2016/0326944 A1* | 11/2016 | Arslanturk | F01P 11/16 |

* cited by examiner

THERMOSTAT MONITORING SYSTEM AND METHOD

BACKGROUND

Field of the Invention

The present invention generally relates to a thermostat monitoring system and method. More specifically, the present invention relates to a thermostat monitoring system and method that detects a thermostat malfunction or failure.

Background Information

Generally conventional engines include a thermostat to maintain the engine near an optimum operating temperature by regulating the flow of coolant to an air-cooled radiator. Various thermostat diagnostic apparatuses have been proposed for diagnosing if a vehicle's thermostat of a cooling system is malfunctioning. Some conventional thermostat diagnosis system use a model to estimate ECT during the cold start of the engine.

SUMMARY

Current regulations require accuracy in the monitoring and diagnosing of thermostat operations after engine warms up. To meet the new regulation requirements, a new engine coolant temperature estimation model used to compare with measured temperatures is needed. It is, however, very difficult to develop such a model with enough accuracy to robustly detect thermostat failure without any false detection.

In view of the state of the known technology, one aspect of the present disclosure is to provide a thermostat monitoring method, comprising measuring an engine coolant temperature with an engine coolant temperature sensor a predetermined amount of time after engine startup, comparing, with a controller, the engine coolant temperature to determine whether the engine coolant temperature has met a predetermined threshold, when the engine coolant temperature has met the predetermined threshold, measuring a plurality of engine coolant temperatures (ECT) with the engine coolant temperature sensor. In one embodiment the entire monitoring range of ECT is divided into four zones based on prescribed temperature thresholds.

The four zones can be Zone 1 (Passing without the Comparison with Model), Zone 2 (Passing with the Comparison with Model), Zone 3 (Failing without the Comparison with Model), and Zone 4 (Failing without the Comparison with Model). Depending on which zone the current ECT reading belongs to, the current ECT measurement is compared with a corresponding predetermined temperature model, or compared with prescribed temperature thresholds directly, and a passing/failing index is incrementing or decrementing at variable rates depending on the comparison results, the zone that the current ECT belongs to, and selected engine operating conditions. Once the passing/failing indices reaches prescribed threshold, the pass/fail test results can be reported respectively. In addition, these indices could also be reset to 0 when the current engine coolant temperature crosses a prescribed threshold, or test is completed (pass or fail). The thermostat monitor, therefore, can run continuously throughout the driving cycle after it is enabled.

BRIEF DESCRIPTION OF THE DRAWINGS

Referring now to the attached drawings which form a part of this original disclosure.

DETAILED DESCRIPTION OF EMBODIMENTS

Figure 1:
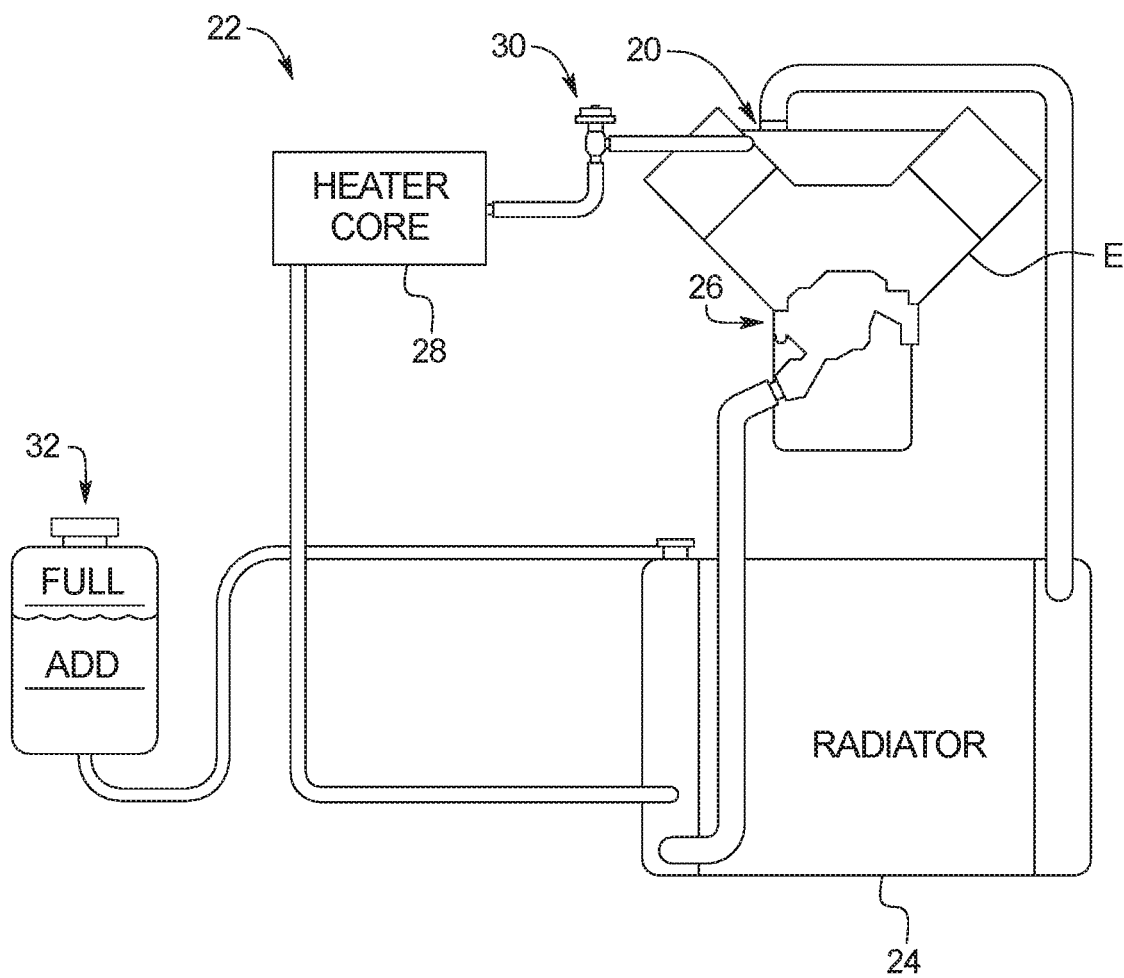
FIG. 1 is a schematic view of the engine cooling system.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, an engine thermostat monitoring system 10 is illustrated in accordance with a first embodiment. As can be seen, the engine thermostat monitoring system 10 includes a sensor 12, a controller 14, a display device 16 and a storage device 18 and monitors a thermostat 20 in an engine cooling system 22, generally of a vehicle, by monitoring the engine coolant temperature (ECT). The engine cooling system cools the engine E and includes a radiator 24, a water pump 26, a heater core 28, a heater control valve 30 and an expansion tank 32.

Figure 2:
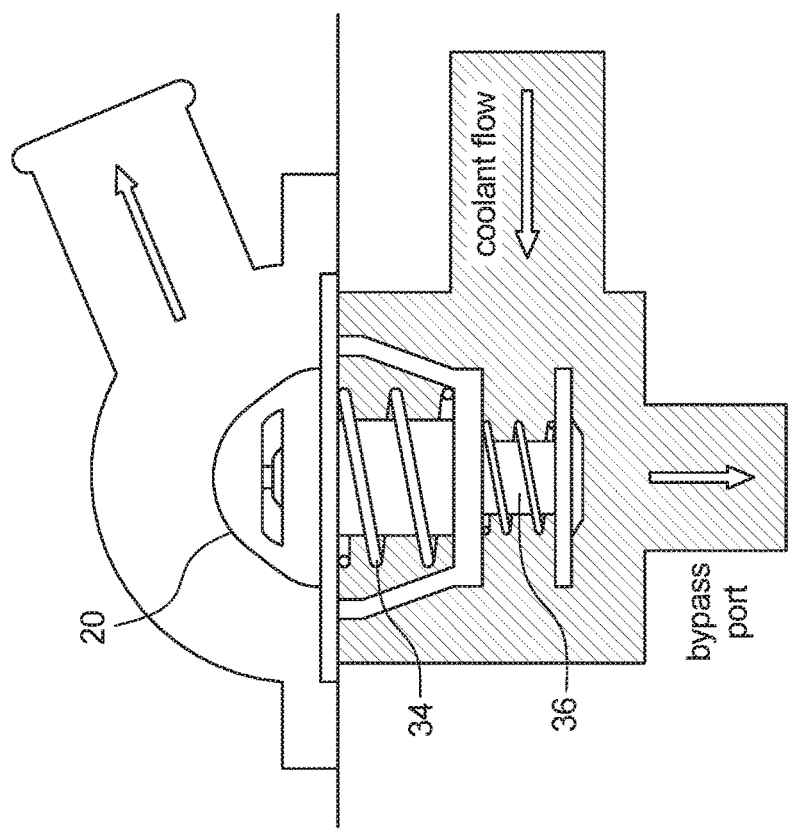
FIG. 2 is an enlarged view of a thermostat for the engine cooling system of FIG. 1 in a closed position.
Figure 4:
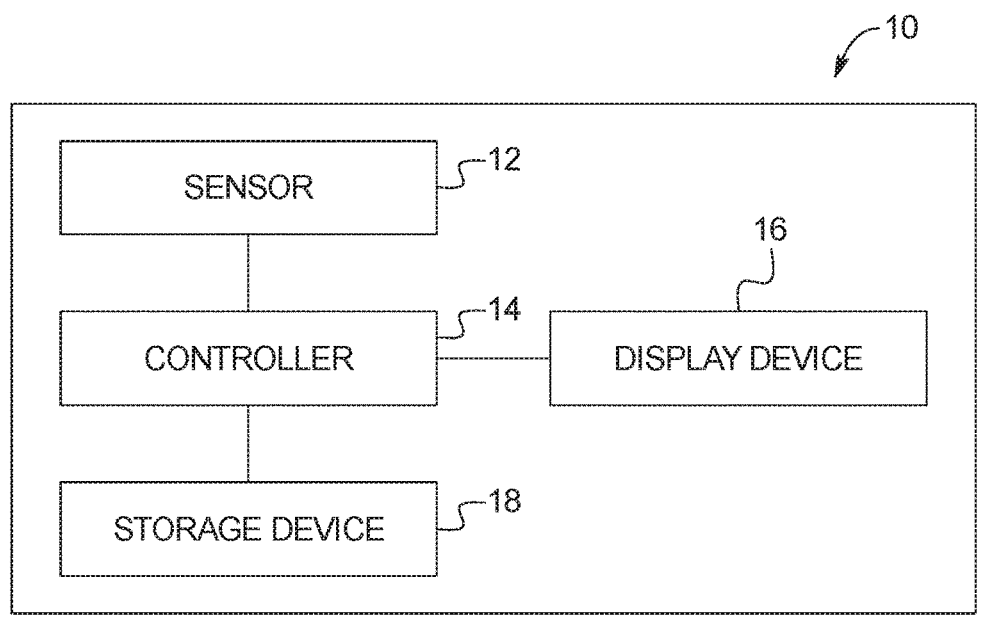
FIG. 4 is a schematic of a thermostat monitoring system according to an embodiment of the present invention.

The engine E can operate at around 200 degrees F. At cold start up, the engine temperature is below this operating temperature and generally requires more fuel to run properly. Thus, as shown in FIG. 2, when the engine is cold the thermostat 20 blocks flow of the coolant to the radiator and opens the bypass circuit. In this mode the water pump 26 circulates coolant only inside the engine E. The coolant is prevented from flowing through the radiator 24 where it would be cooled. Instead coolant flows through the bypass and back to the water pump 26. The effect is a quick increase in engine temperature.

Figure 3:
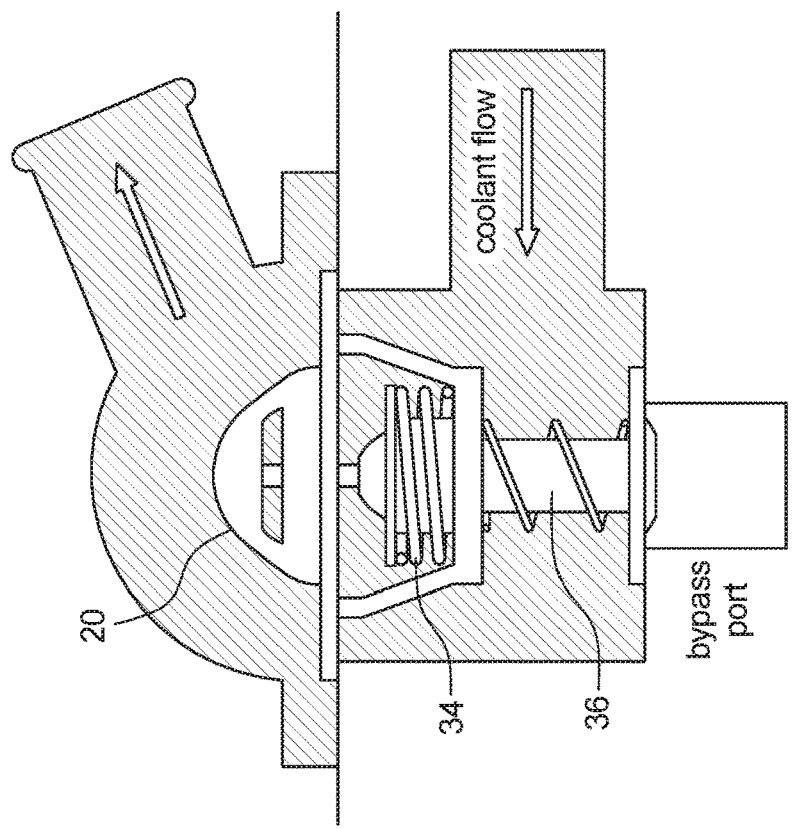
FIG. 3 is an enlarged view of a thermostat for the engine cooling system of FIG. 1 in an open position.

The thermostat 20 can be a temperature controlled valve. The spring 34 loaded valve is attached to a small cylinder 36 filled with thermal wax. As shown in FIG. 3, when the engine warms up, coolant transfers heat to the wax-filled cylinder 36. The heat causes the cylinder 36 to expand and pushes down on the spring 34 loaded valve. The water pump 26 now pushes coolant through the cylinder head and out to the radiator 24, where the heat is removed. Lower temperature coolant leaves the radiator 24 and circulates back to the water pump 26 completing the cycle. If the temperature begins to fall below the limit set by the thermostat 20 the flow will be restricted until it rises to the proper level.

As coolant ages, the additives that prevent corrosion are depleted. This causes damage to the thermostat 20 and can cause the thermostat 20 to stick. If the thermostat 20 sticks open, the engine E runs too cold and wastes fuel. When the thermostat 20 sticks closed the engine E will overheat. Overheating causes cylinder heads in the engine E to expand greatly. This has the effect of crushing the cylinder head gasket which can crack the cylinder heads. Pistons in the engine E also expand and gall the cylinder walls. Overheating, even for a short while can severely damage the engine E.

The present engine thermostat monitoring system 10 monitors the status and operation of the thermostat 20 and accurately determines whether operation is within an acceptable rage.

The controller 14 for the engine thermostat monitoring system 10 can be any suitable controller 14, and in one embodiment can be an engine control unit (ECU). The controller 14 is operatively connected to the sensor 12 (e.g., an engine coolant sensor 12), a display device 16 and the storage device 18. The controller 14 can include a microcomputer with a control program that controls the sensor 12, the display device 16 and the storage device 18 as discussed below. The controller 14 can also include other conventional components such as an input interface circuit, an output interface circuit, and storage device 18s such as a ROM (Read Only Memory) device and a RAM (Random Access Memory) device. The microcomputer of the controller 14 is programmed to control the sensor 12 and the storage device 18. The memory circuit stores processing results and control programs such as ones for the sensor 12, the display device 16 and the storage device 18 operation that are run by the processor circuit. The controller 14 is operatively coupled to the sensor 12, the display device 16 and the storage device 18 in a conventional manner. The internal RAM of the controller 14 stores statuses of operational flags and various control data. The controller 14 is capable of selectively controlling any of the components of the engine thermostat monitoring system 10 (or any other desired aspect) in accordance with the control program. It will be apparent to those skilled in the art from this disclosure that the precise structure and algorithms for the controller 14 can be any combination of hardware and software that will carry out the functions of the present invention.

The sensor 12 can be any suitable engine coolant temperature sensor (ECT sensor 12), and measures the temperature of the engine coolant of an engine (e.g. an internal combustion engine). The readings from this sensor 12 are then fed back to the controller 14 for control purposes.

The display device 16 can be any suitable display device. For example, the display device 16 can be a light or a warning within the vehicle, such as a check engine light a warning light an auditory sound or any other suitable notification system. Alternatively, the display device 16 can be on a remote device that is wirelessly or directly wired to the system 10 to check the engine operating status. Accordingly, in any of the embodiments described herein, when a pass or a fail is determined, such an indication can be displayed on the display device 16.

Figure 5:
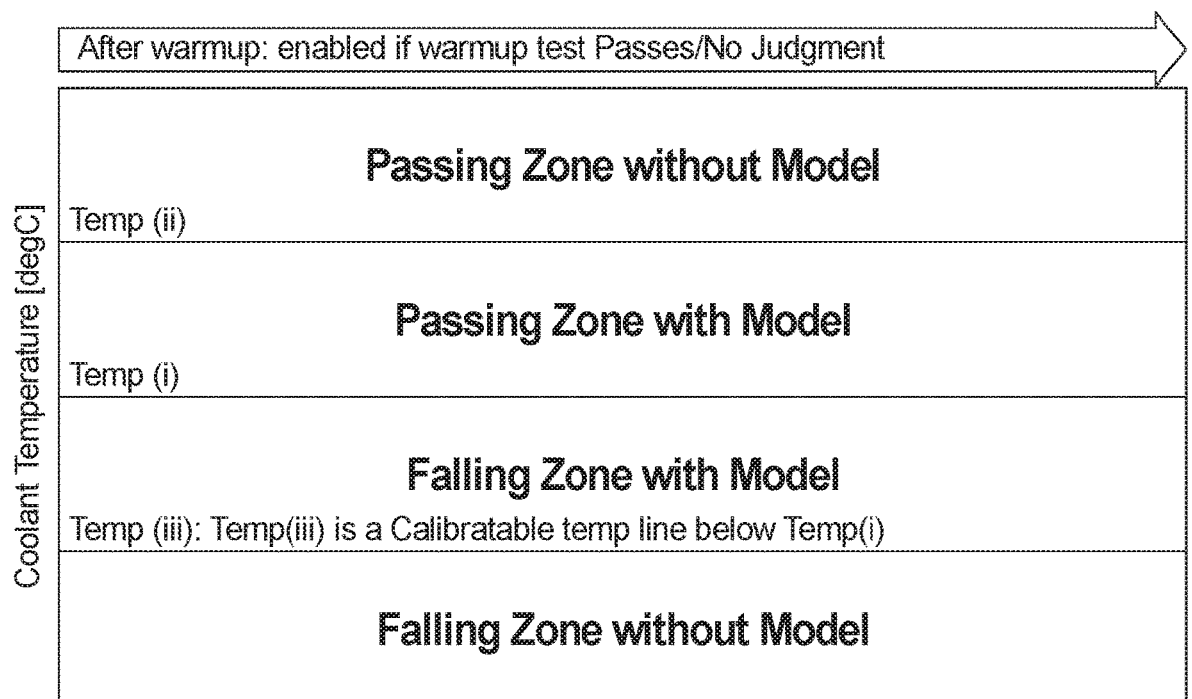
FIG. 5 is chart illustrating the four pass/fail zones.

The present system 10 is a continuously-running thermostat monitoring system that improves monitoring and determination of failure of the thermostat 20. The embodiments discussed herein are based on a four-zone passing/failing system for thermostat malfunction detection. Based on possible regulation requirements and thermostat monitoring needs, the ECT operating range is divided into four zones for thermostat fault detection. Each zone is separated from another zone by a predetermined temperature. As shown in FIG. 5, when the ECT is greater than or equal to the second predetermined temperature, such ECT operating zone is the thermostat monitoring "Passing Zone without Model" (Zone 1). That is to say, the increment of passing index in this zone is independent of an associated ECT model estimation. In other words, the model or predetermined model, as used herein, is a predicted temperature, at which the ECT is predicted based on various factors in variables of the engine at predetermined times to establish a predetermined model or predetermined temperature model that is stored in a storage device (e.g., storage device 18). The controller has access to the predetermined model, and as discussed herein can compare the actual ECT to the predetermined model.

When the ECT is greater and or equal to the first predetermined temperature and less than the second predetermined temperature, the ECT operating zone is the thermostat monitoring "Passing Zone with Model" (Zone 2). That is, the increment of passing index in this zone relies on the associated ECT model estimation.

When the ECT is greater and or equal to the third predetermined temperature and less than the first predetermined temperature, the ECT operating zone is the thermostat monitoring "Failing Zone with Model" (Zone 3).

When the ECT is less than the third predetermined temperature, the ECT operating zone is the thermostat monitoring "Failing Zone without Model" (Zone 4).

Figure 6:
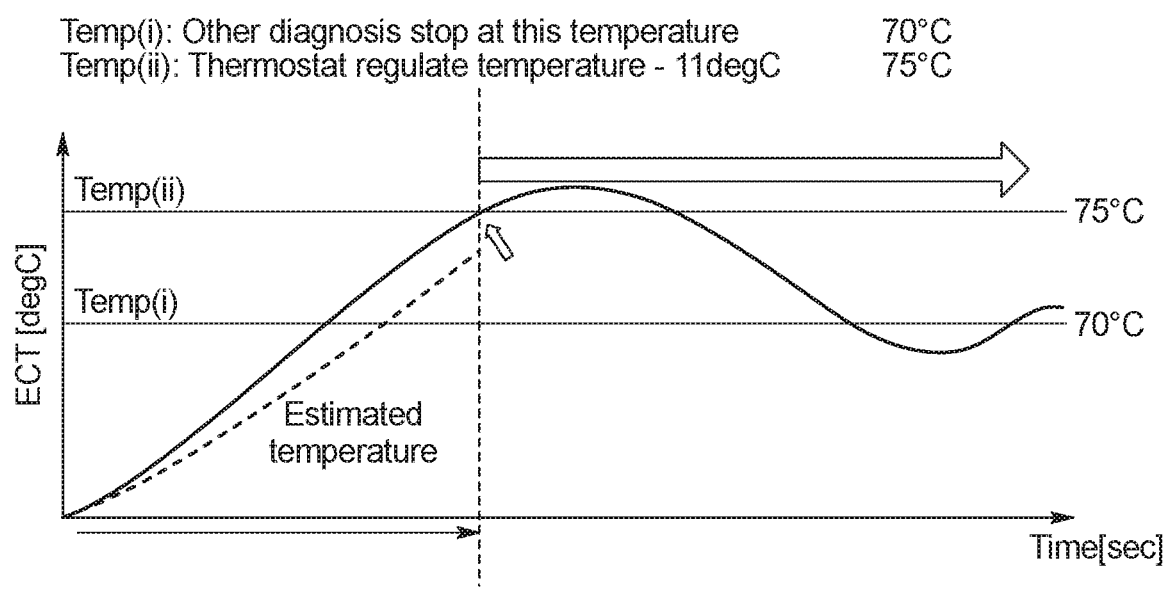
FIG. 6 is a graph illustrating an example of enabling the after warm-up continuous thermostat monitoring after the actual engine coolant temperature is above the estimated temperature during engine warming up (i.e., no fault is detected during the warm-up test)

FIG. 6 illustrates the temperature and time requirements after engine is warmed up for a faulty thermostat. In the embodiment, the first predetermined temperature (Temp i) of the ECT is 70 degrees C., and the second predetermined temperature (Temp ii) of the ECT is 75 degrees C. As the engine E warms up for cold start, the actual ECT increases at a rate that is faster than expected based on the predicated model or the estimated temperature. In this embodiment, a diagnosis takes place at the start up and ends at a first predetermined time. As shown, the thermostat 20 could be determined to have failed in an initial diagnosis prior to reaching the predetermined time. However, in this embodiment of the present invention, the continuous diagnosis takes place after reaching the second predetermined temperature. Thus, as stated above, the monitoring and diagnosis of the thermostat 20 can occur continuously during engine run and is more accurate.

Figure 7:
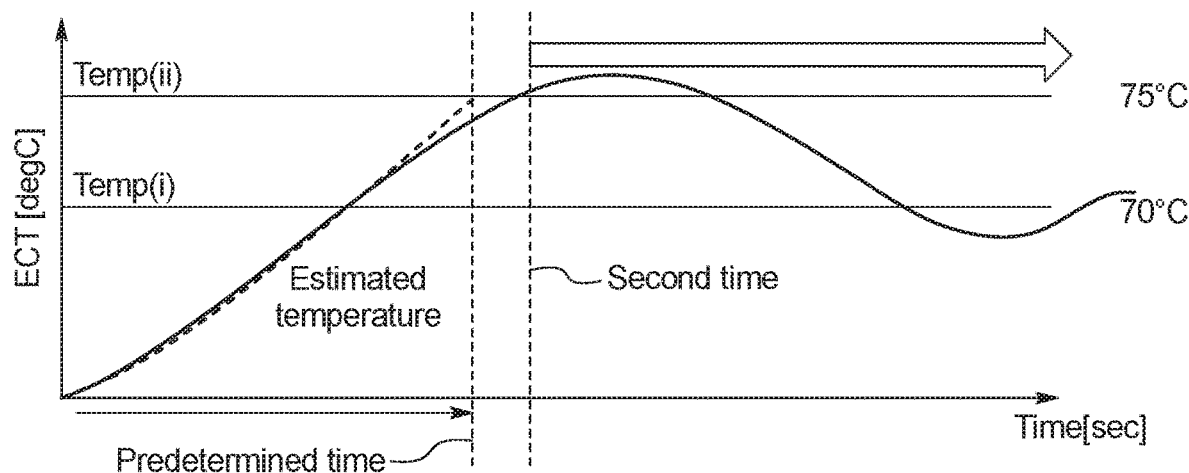
FIG. 7 is a graph illustrating an example of enabling the after warm-up continuous thermostat monitor after the actual engine coolant temperature is below the estimated temperature during engine warming up and no fault is set (i.e., there is no judgement during the warm-up test)

As shown in FIG. 7, in the present embodiment, the thermostat monitoring algorithm is always enabled after ECT reaches second predetermined temperature (Temp ii) for the first time—based on a reading from the sensor 12, and there is no previous fault for thermostat warmup diagnosis. In this embodiment, it can be seen that the actual ECT is delayed relative to the predicated model or the estimated temperature, and the actual ECT does not reach the second predetermined temperature (temp ii) at the predetermined time. As illustrated, the system 10 can determine that the thermostat 20 has failed since the actual ECT failed to reach the second predetermined temperature within the predetermined time. However, in this embodiment, the continuous diagnosis can begin after the actual ECT reaches the second predetermined temperature at the second time. Such a system 10 can result in a more accurate diagnosis of the thermostat 20. However, it is noted that diagnosis may not occur (e.g., remain disabled) if the actual ECT does not reach second predetermined temperature (Temp ii) or if there is a previous fault in the thermostat warmup diagnosis.

Figure 8:
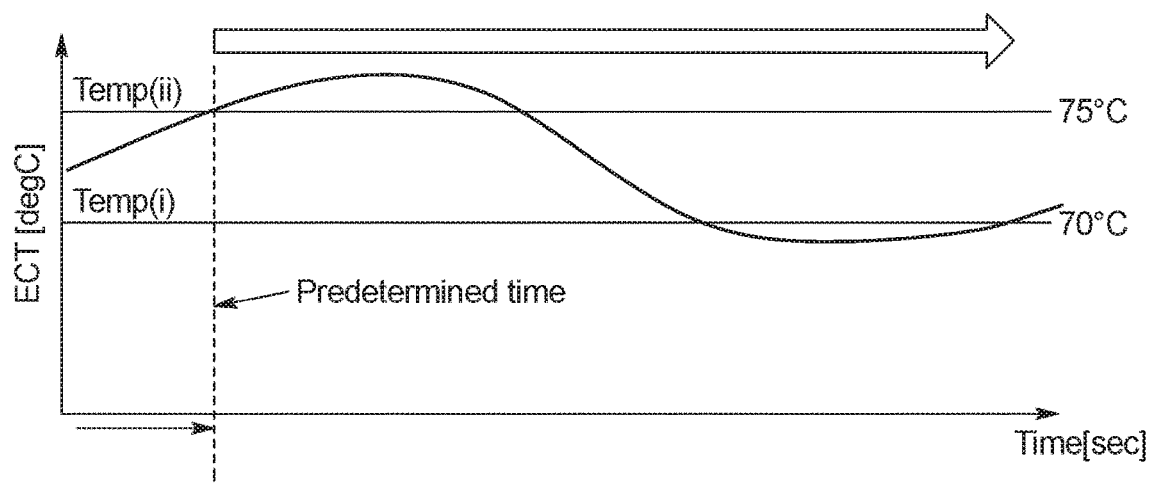
FIG. 8 is a graph illustrating an example of enabling the after warm-up continuous thermostat monitor after the engine start right after a short period of (i.e, there is no warm-up test in the beginning of the driving cycle) soak time.

FIG. 8 illustrates another embodiment in which the system 10 determines whether the thermostat 20 can pass after a sort soak time. In this embodiment, it can be seen that the temperature reaches the second predetermined temperature (temp ii—e.g. 75 degrees C.) relatively quickly. It is noted that in this embodiment, the system detects whether the thermostat is open such that the ECT can drop below the first predetermined temperature (Temp. ii) during normal driving conditions.

Figure 9:
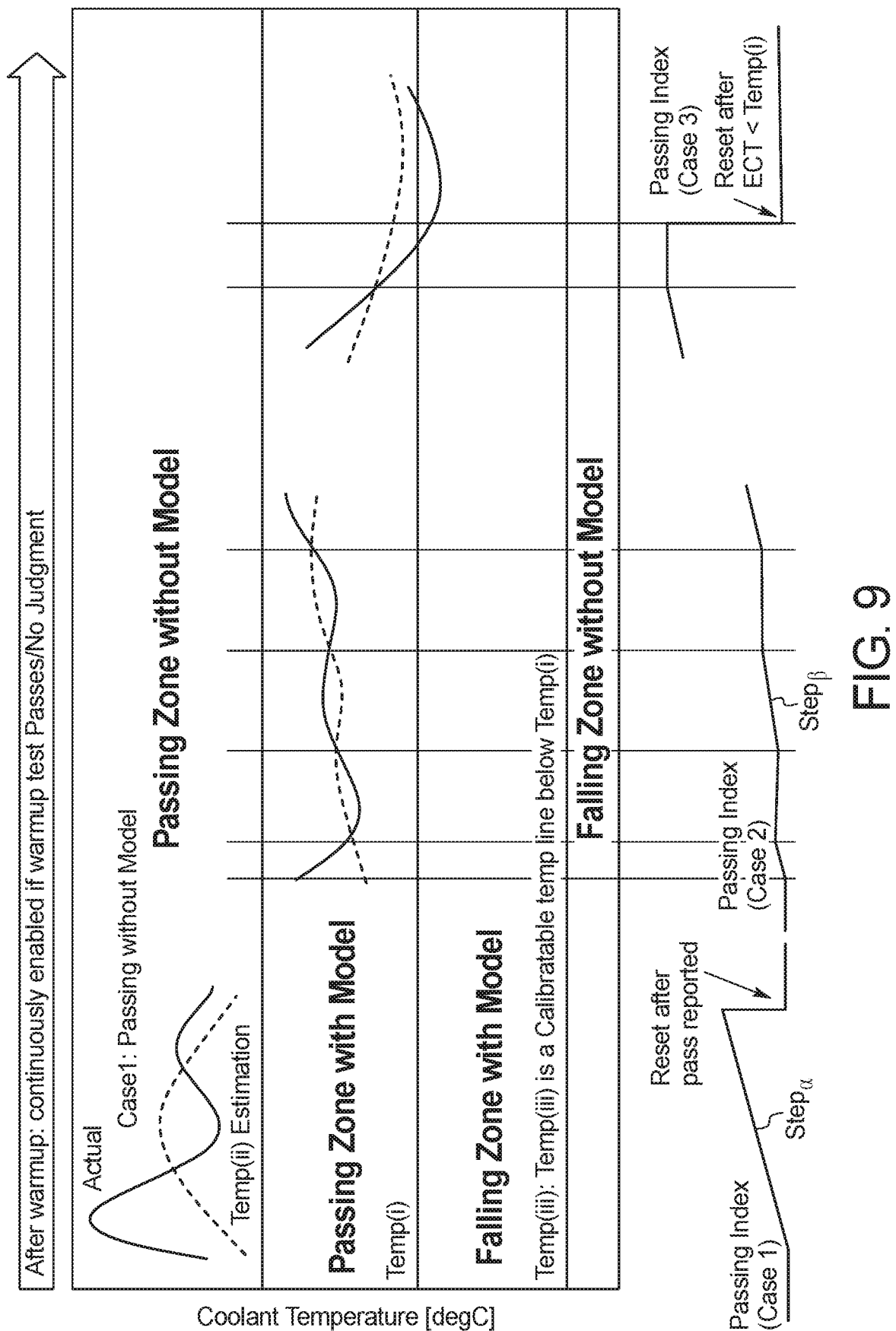
FIG. 9 illustrates a chart indicating different scenarios of the passing index increment for a thermostat monitor.

As shown in FIG. 9, illustrates three cases in which a pass/fail determination is made after it has been determined that the warm test has been passed and there are no previous fail determinations, as shown in FIG. 8. In this embodiment, the controller 14 is programmed to add or subtract variable increment steps of the passing index in the passing zone without model and the passing zone with model. Such a system 10 reduces the dependency on model, and improve the robustness of passing. The ratio between the increment step in the passing zone without model and that in the passing zone with model is adjustable based on the accuracy of the model. The less accurate the model is, the high ratio between the two step increments are.

Case 1 illustrates a passing situation without use of the model (Zone 1). As shown in FIG. 9, when the actual ECT is greater than or equal to the second predetermined temperature (Temp ii) the system 10 using the passing zone without the model. In this passing zone, the passing index is incremented by a predetermined number step$_\alpha$ (e.g., 5), regardless of the estimation value from model. Once the passing timer crosses a threshold, a pass can be reported and numerator is incremented by 1.

Case 2 illustrates a passing situation with the model (Zone 2). As shown in FIG. 9, when the actual ECT is less than the second predetermined temperature (Temp ii), but greater than the first predetermined temperature, the system 10 utilizes the passing zone with the model. That is, the controller 14 compares the actual ECT with a predetermined model, based on any suitable engine variables and/or factors. In this embodiment, the passing index will increment by a predetermined number stem (e.g., 1). In this embodiment, the passing index can hold its value if the actual ECT is less than the model and the passing index is non-zero.

Case 3 illustrates a failing situation with the model (Zone 2). As shown in FIG. 9, when the actual ECT is less than a first predetermined temperature (Temp i, e.g., 70 degrees C.), the controller 14 compares the actual ECT with the predetermined model, based on any suitable engine variables and/or factors. In this embodiment, when the actual ECT is below the first predetermined temperature (Temp i) and below the predetermined model, the passing index will reset to 0, a fail is reported and the passing index is reset to zero. The fail can be displayed on the display device 16.

Figure 10:
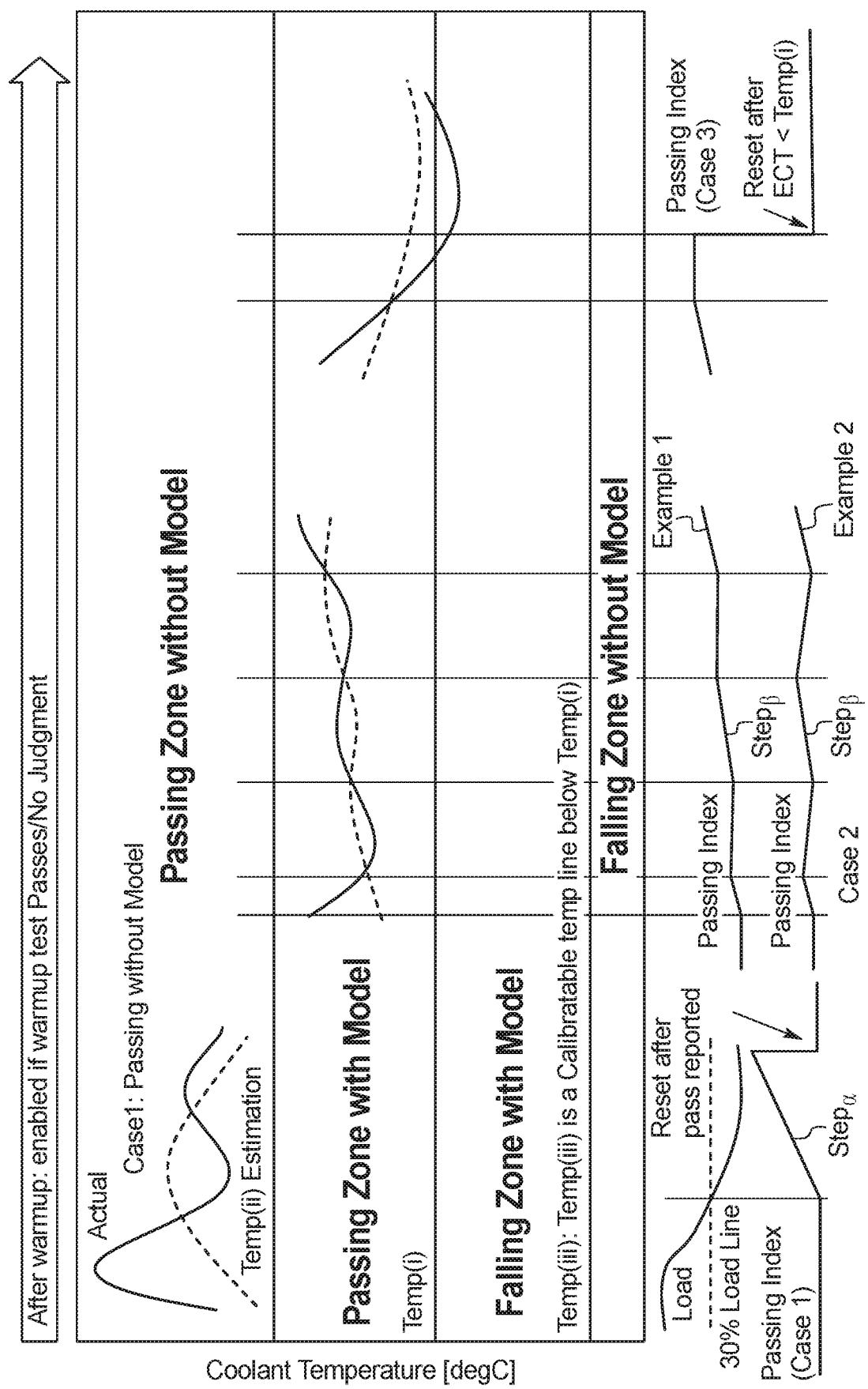
FIG. 10 illustrates another chart indicating the different scenarios of the passing index increment for a thermostat monitor when there is an existing thermostat failure.

FIG. 10 illustrates, illustrates three cases in which a pass/fail determination has been made after it has been determined that the warm test has been passed and there is previous fail determination (i.e., a pending or confirmed thermostat fault). In this embodiment, additional restrictions are set to increment the passing index in the passing zone without model. Such restrictions result in robustness for not clearing the pending/confirmed fault and increasing the chance to duplicate the fault when there is a pending fault Preferably, in one embodiment the controller 14 enables the passing index to increase when the actual ECT is greater than the predetermined model, and reduce when actual ECT is less than the predetermined model. Such an embodiment increases the robustness of the passing algorithm in the zone with model. However, if desired, in the passing zone with model the controller 14 can stop and hold the passing index. Accordingly, in such an embodiment, the passing index can only increase in the passing zone without model.

Case 1 illustrates a passing situation without use of the model (Zone 1). As shown in FIG. 10, when the actual ECT is greater than or equal to the second predetermined temperature (Temp ii) the system 10 using the passing zone without the model. In this passing zone, the passing index is incremented by a predetermined number step$_\alpha$ (e.g., 5), when the engine load is less than or equal to a predetermined engine threshold (e.g., 30%) and when the vehicle is at or above a predetermined vehicle speed (e.g., greater and or equal to 20 MPH). Once the passing timer crosses a threshold, a pass can be reported and numerator is incremented by 1, and the previous once the passing index crosses a predetermined threshold, a pass can be reported, and the pending or confirmed thermostat fault can be cleared, and numerator is incremented by 1.

Case 2 illustrates a passing situation with the model (Zone 2). As shown in FIG. 10, when the actual ECT is less than the second predetermined temperature (Temp ii), but greater than the first predetermined temperature, the system 10 utilizes the passing zone with the model. That is, the controller 14 compares the actual ECT with a predetermined model, based on any suitable engine variables and/or factors. In this embodiment, the passing index will increment by a predetermined number step$_\beta$ (e.g., 1) if the actual ECT is greater than the predetermine model and the failing index is 0. In Example 1, the passing index will hold its value if the actual ECT is less than the predetermined model and the passing index is non-zero. Alternatively, in Example 2, the passing index can be reduced by 0.2 if the actual ECT is less than the predetermined model until the passing index reaches 0, when the passing index is non-zero. Once the passing index crosses a predetermined threshold, a pass can be reported, and the pending or confirmed thermostat fault can be cleared, and numerator is incremented by 1.

Case 3 illustrates a failing situation with the model (Zone 3). As shown in FIG. 10, When the actual ECT is less than the first predetermined temperature (Temp i), the controller 14 compares the actual ECT with the predetermined model, based on any suitable engine variables and/or factors. In this embodiment, when the actual ECT is below the first predetermined temperature (Temp i) and below the predetermined model, the passing index will reset to 0, a fail is reported and the passing index is reset to zero.

Figure 11:
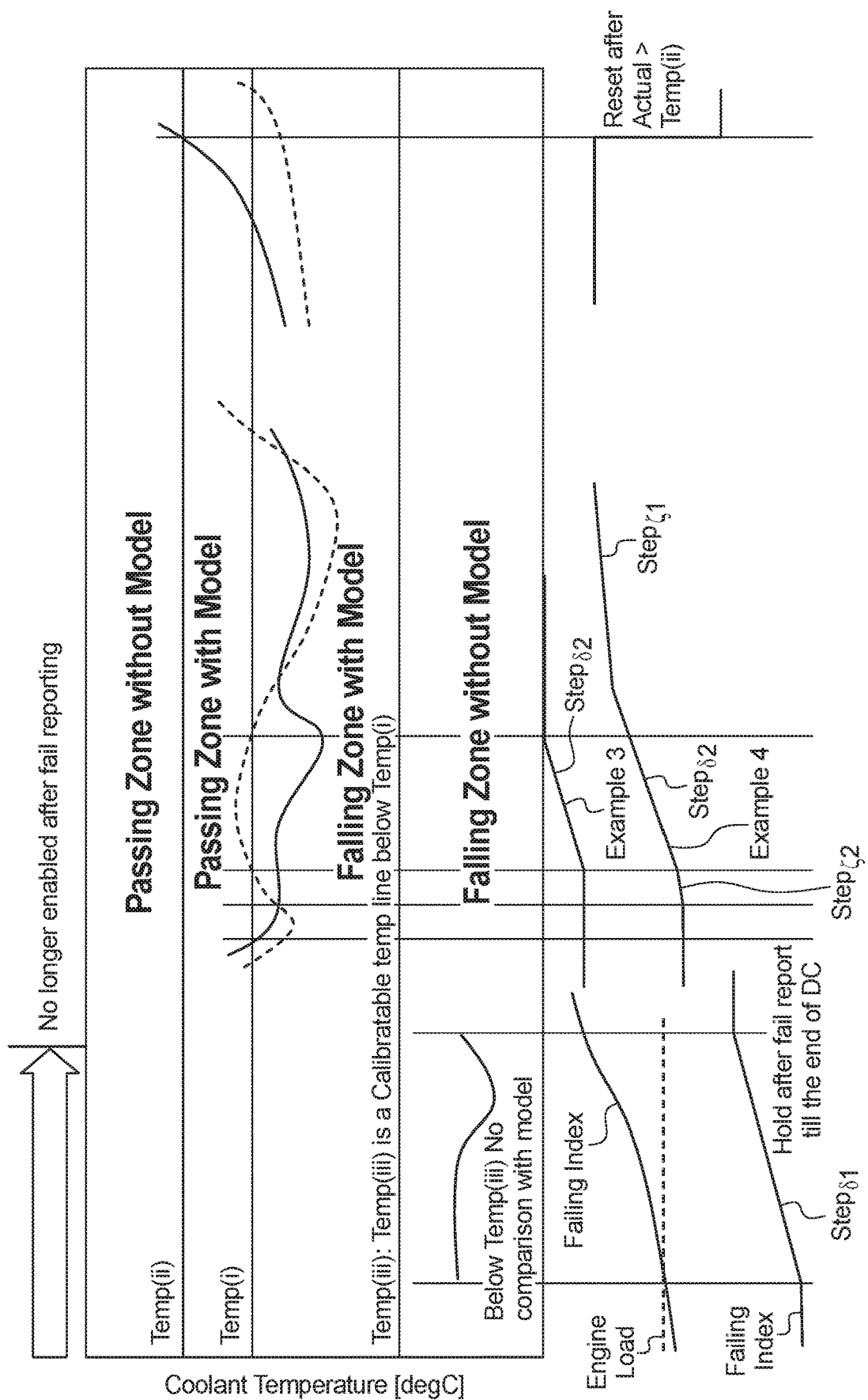
FIG. 11 illustrates another chart indicating different scenarios of the failing index increment for a thermostat monitor.

FIG. 11 illustrates an embodiment in which restrictions are added to increment a failing index in the failing zone without model (Zone 4). Such an embodiment enables avoids noise factors that cause the ECT to drop during low load conditions. In one embodiment, in the failing zone with model, the failing index is incremented only when predetermined model is greater than or equal to the first predetermined temperature (Temp i). In another embodiment, the failing index increment rate varies based on when the actual ECT is greater than or equal to the predetermined model, the actual ECT is less than the predetermined model, and the actual ECT is less than the first predetermined temperature (Temp i), and the first predetermined temperature (Temp i) is less than or equal to the predetermined model. Such an embodiment increases the robustness of the fault detection and minimizes the impact from transient noise factors.

Thus, as shown in FIG. 11, when the failing index is greater than zero and the actual ECT is in the failing zone with model (Zone 3) (i.e., less than Temp(i)), the failing index remains the same when the ECT is less than the predetermined model and decreases by a calibratable step when the ECT is greater than or equal to the predetermined model. The failing index can be reset when the actual ECT is greater than the second predetermined temperature (Temp ii).

Thus, as shown in FIG. 11, when the actual ECT is less than the third predetermined temperature (Temp iii) (Temp (iii) is a new temp line below Temp i), the failing index can be incremented by stem (e.g., 10), regardless of the predetermined value. If desired, in one embodiment, the failing index can vary based on the engine load (over 30%) and actual ECT.

Moreover, as illustrated in FIG. 11, in Example 3, when the actual ECT is less than the first predetermined temperature (Temp i), the failing index can be incremented by a predetermined stem (e.g., 3) when the predetermined model is greater and the third predetermined temperature (Temp iii). The failing index can be held and there is no judgement for other temperature situations.

Alternatively, in Example 4 the failing index can be incremented by stem (e.g., 3) when the actual ECT is less than the third predetermined temperature (Temp iii) and predetermined model is greater and the third predetermined temperature (Temp iii), the failing index can be incremented by $step_{\zeta 1}$ (e.g., 1) when the actual ECT is greater than the predetermined and the engine load, which is in turn greater than or equal to a threshold E, and predetermined vehicle speed conditions exists, such an increment can be calibratable, and prevents an actual ECT that is larger than the predetermined model due to a model accuracy issue. Further, the failing index can be incremented by $step_{\zeta 2}$ (e.g., 2), when the actual ECT is less than the predetermined model and the predetermined model is less than the third predetermined temperature (Temp i). In these embodiment, a failure can be reported and set when the failing index crosses a threshold F As shown in FIG. 11, when the actual ECT is greater than or equal to the first predetermined temperature (Temp i), and less than the second predetermined temperature (Temp ii) (Zone 2), the failing index will hold when the actual ECT is less than the predetermined model and the failing index is greater and zero. Additionally, the failing index will decrease by $step_\eta$ (e.g., 1) when the actual ECT is greater than the predetermined model when the failing index is greater than zero 0. When the actual ECT is greater than the second predetermined temperature (Temp ii), the failing index will be reset to 0.

Embodiments of the present invention cause the diagnostic algorithm to run continuously when passing, and stop the algorithm after a failure and latch it for the rest of the key cycle (robustness against noise factors after fault detection and save ECU resources). The diagnostic is re-enabled in a new key cycle. After the pass index crosses the prescribed threshold, a pass will be reported to clear pending/confirmed fault (Diagnostic Trouble Code), if any. Additionally, the controller 14 will reset the passing index and other testing parameters associated with the past passing test to force the monitoring to restart. Once a fault is detected (the failing index crosses the prescribed threshold), the diagnostic algorithm will be latched to test complete status for the rest of the driving cycle. All diagnostic testing related parameters are reset at keyon such that the diagnostic could be re-enabled once ECT crosses the second predetermined temperature (Temp ii) for the $1^{st}$ time in that key cycle.

Figure 12A:
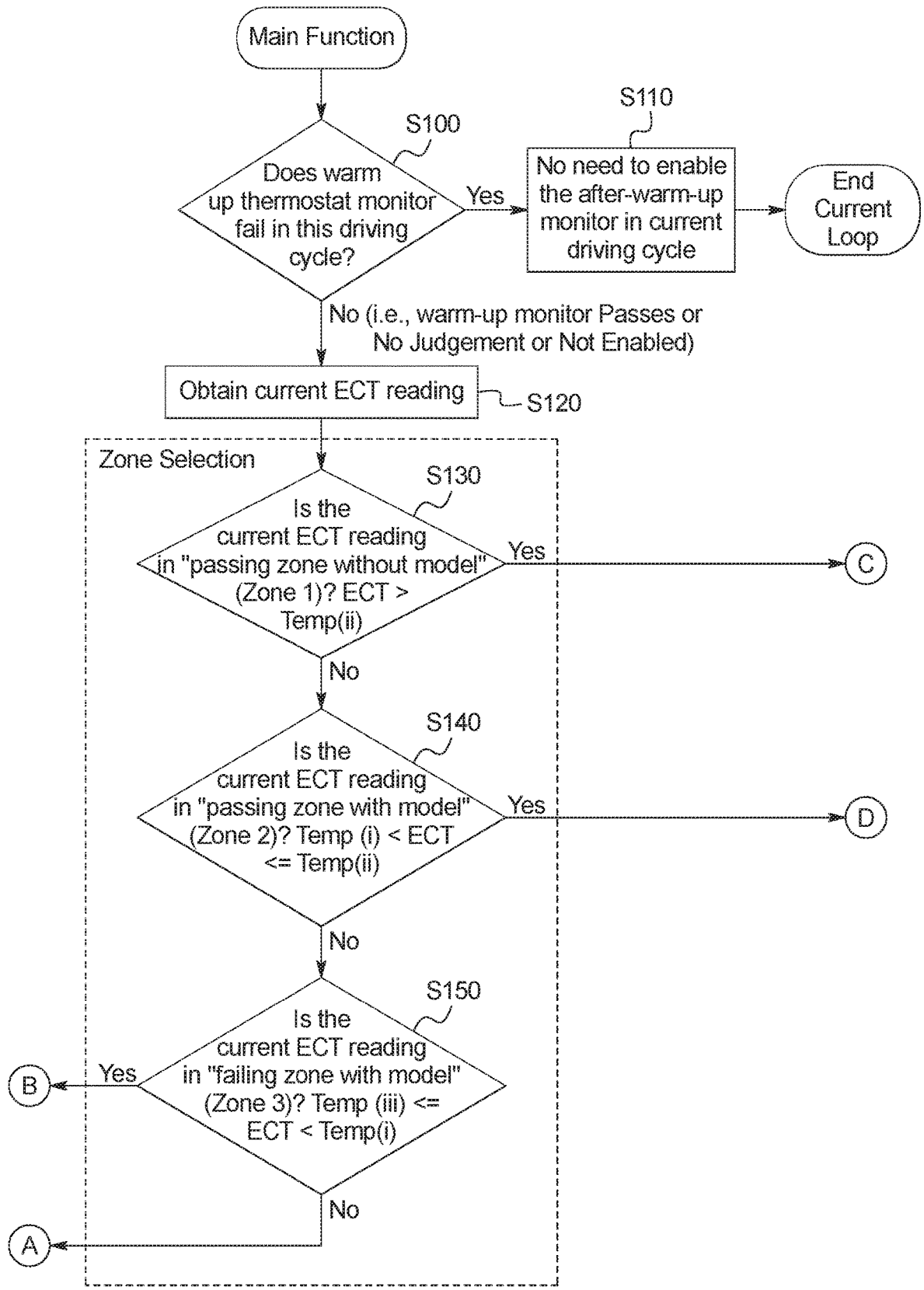
FIG. 12A-C is a flow chart illustrating the process to determine whether the thermostat has passed the diagnosis process.
Figure 12B:
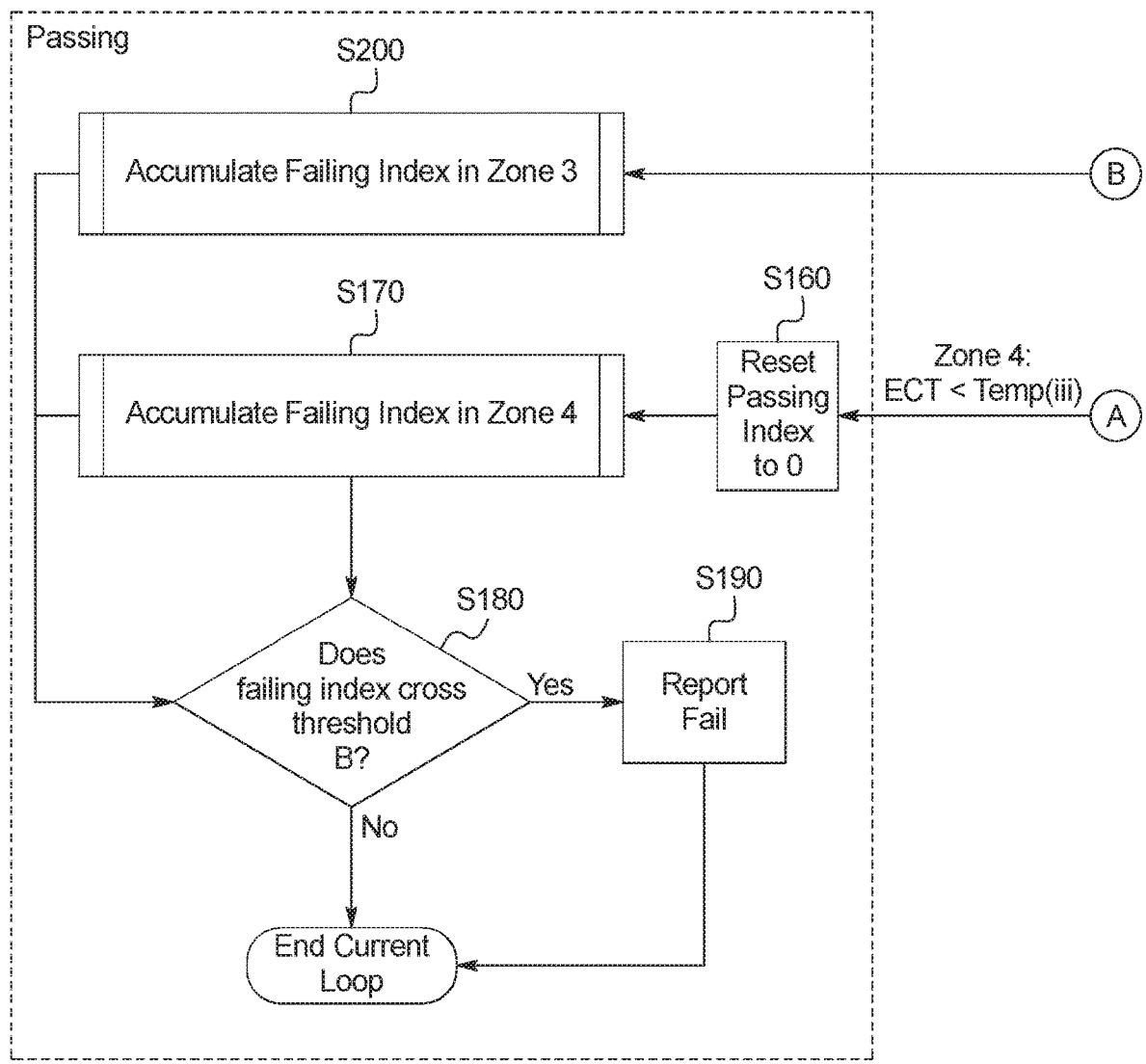
Figure 12C:
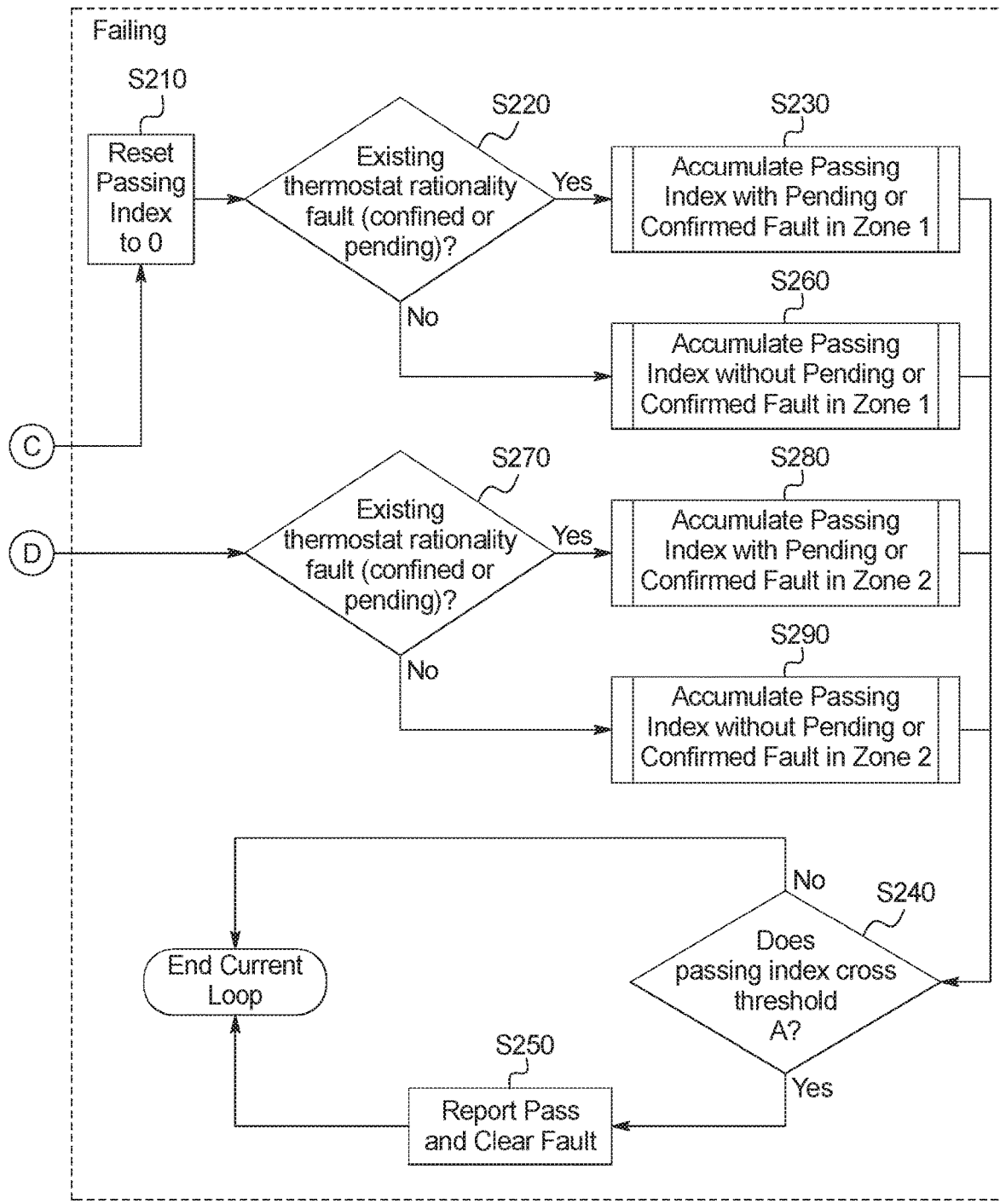

FIGS. 12A-C illustrate a flow chart for the procedure of one embodiment of the present invention. First in step S100 the controller 14 is programmed to determine whether the thermostat monitor fails in a standard existing driving cycle. If the thermostat monitors fails in this cycle, the controller, in step S110, can determine that there is no need to enable the after warm-up monitor in the current driving cycle and ends the current loop.

If the controller 14 determines that the thermostat monitors does not fail in this cycle (i.e., warm-up monitor passes or no judgement is made or the warm-up monitor is not enabled), the controller, in step S120, causes the current ECT reading to be obtained.

The controller then moves to temperature zone selection. The controller 14 determines whether the current ECT temperature reading is within the "passing zone without model" (Zone 1) in step S130. In other words, is the ECT greater than the second predetermined temperature (Temp ii)? If the controller 14 determines that the ECT is less than the second predetermined temperature (Temp ii), in step S140, the controller 14 determines whether the current reading is in the "passing zone with model" (Zone 2). That is, the controller 14 determines whether the ECT reading is greater than or equal to the first predetermined temperature (Temp i) and greater than or equal to the second predetermined temperature (Temp ii). In other words, is the ECT greater than the first predetermined temperature (Temp i)?

If the controller 14 determines that the ECT is less than the first predetermined temperature (Temp i), in step S150, the controller 14 determines whether the current reading is in the "failing zone with model" (Zone 3). That is, the controller 14 determines whether the ECT reading is greater than or equal to the third predetermined temperature (Temp iiii) and greater than or equal to the first predetermined temperature (Temp i). In other words, is the ECT greater than the third predetermined temperature (Temp iii)?

If the controller 14 determines that the ECT is less than the third predetermined temperature (Temp iii), the controller 14 determines that the current reading is in Zone 4 (i.e., failing zone without model) and resets the passing index to 0 in step S160. The controller then accumulates the failing index in Zone 4 in step S170. The controller 14 then determines whether the failing index crosses threshold B in step S180. If the failing index crosses threshold B, a fail is reported in step S190 and the current loop is ended. If the failing index does not cross threshold B in step S180, the current loop is ended.

Turning back to step S150, if the controller 14 determines that the ECT is greater than or equal to the third predetermined temperature (Temp iii), the controller 14 determines that the current reading is in Zone 3 (i.e., failing zone with model). The controller 14 then accumulates the failing index in Zone 3 in step S200. The controller 14 then determines whether the failing index crosses threshold B in step S180. If the failing index crosses threshold B, a fail is reported in step S190 and the current loop is ended. If the failing index does not cross threshold B in step S180, the current loop is ended.

Turning back to step S130, if the controller 14 determines the ECT reading to greater than second predetermined temperature (Temp ii), the controller 14 resets the failing index to 0 in step S210. The controller 14 then determines the existing thermostat rationality fault (i.e., is there a fault confirmed or pending) in step S220. If there is a fault confirmed or pending, the controller 14, in step S230 accumulates the passing index with a pending or confirmed fault in Zone 1. The controller 14 in step S240 then determines whether the passing index crosses the threshold A. If the passing index crosses the threshold A, a pass is reported and the fault is cleared (if any) in step S250, the current loop is then ended. If the passing index does not cross the threshold A, the current loop is then ended.

Turning back to step S220, if there is no fault confirmed or pending, the controller 14, in step S260 accumulates the passing index without a pending or confirmed fault in Zone 1. The controller 14 in step S240 then determines whether the passing index crosses the threshold A. If the passing index crosses the threshold A, a pass is reported and the fault is cleared (if any) in step S250, the current loop is then ended. If the passing index does not cross the threshold A, the current loop is then ended.

Turning back to step S140, if the controller 14 determines the ECT reading to greater than first predetermined temperature (Temp i) and less than or equal to the second predetermined temperature (Temp ii), the controller 14 then determines the existing thermostat rationality fault (i.e., is there a fault confirmed or pending) in step S270. If there is a fault confirmed or pending, the controller 14, in step S280 accumulates the passing index with a pending or confirmed fault in Zone 2. The controller 14 in step S240 then determines whether the passing index crosses the threshold A. If the passing index crosses the threshold A, a pass is reported and the fault is cleared (if any) in step S250, the current loop is then ended. If the passing index does not cross the threshold A, the current loop is then ended.

Turning back to step S270, if there is no fault confirmed or pending, the controller 14, in step S290 accumulates the passing index without a pending or confirmed fault in Zone 2. The controller 14 in step S240 then determines whether the passing index crosses the threshold A. If the passing index crosses the threshold A, a pass is reported and the fault is cleared (if any) in step S250, the current loop is then ended. If the passing index does not cross the threshold A, the current loop is then ended.

Figure 13:
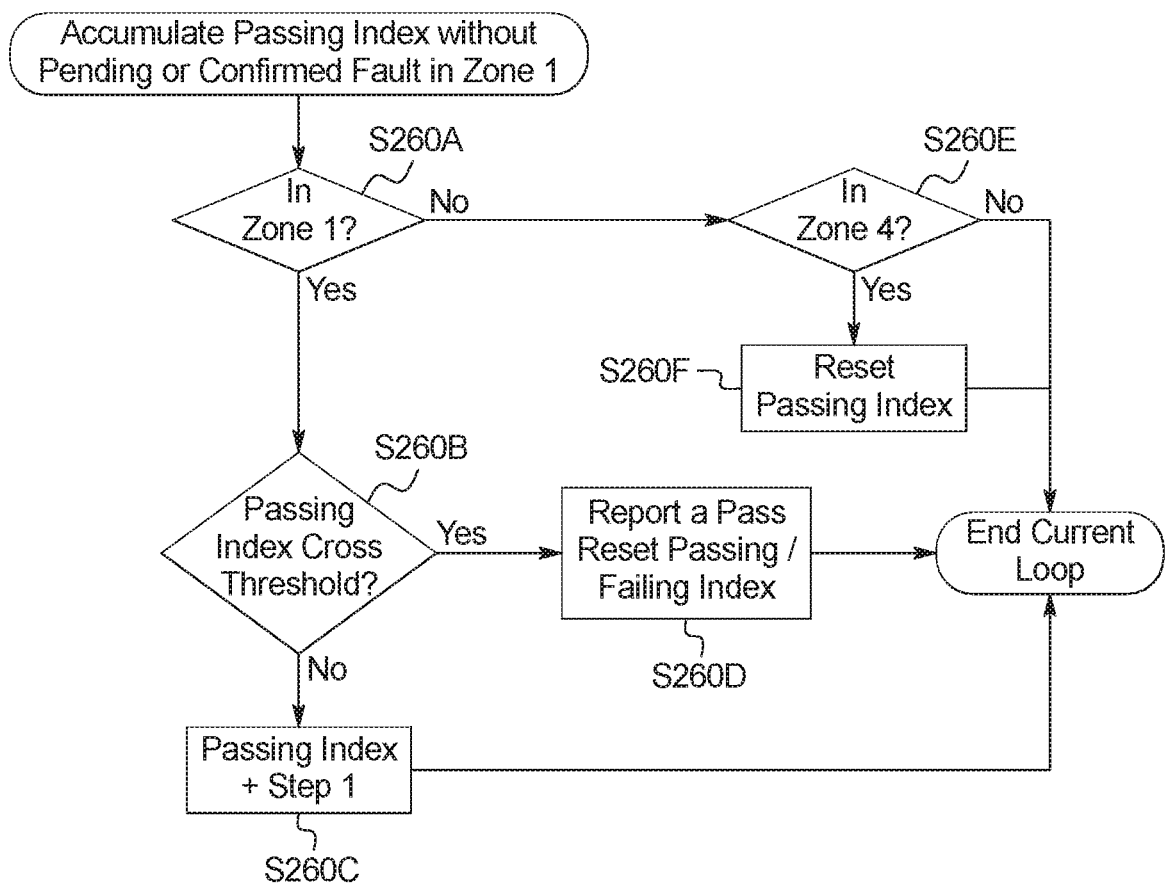
FIG. 13 is a flow chart illustrating the process of the accumulation of the passing index without pending of confirmed fault in Zone 1.

FIG. 13 is a flow chart illustrating the process of the accumulation of the passing index without pending of confirmed fault in Zone 1, i.e., step S260. First in step 260A, the controller 14 determines whether the ECT reading is in Zone 1. If the ECT reading is in Zone 1, the controller 14 determines whether the passing index crosses a threshold in step S260B. If the threshold has not been passed, in step S260C, the passing index is increased by plus one step, and the current loop is ended. If the passing index does cross a threshold, a pass is reported in step S260D and the failing and/or passing index is reset, and the current loop is ended. If in step S260A, the ECT reading is not in Zone 1, the controller 14 determines whether the ECT reading is in Zone 4 in step S260E. If the ECT reading is not in Zone 4, the current loop is ended. If the ECT reading is in Zone 4, the controller 14 resets the passing index in S260F and the current loop is ended.

Figure 14:
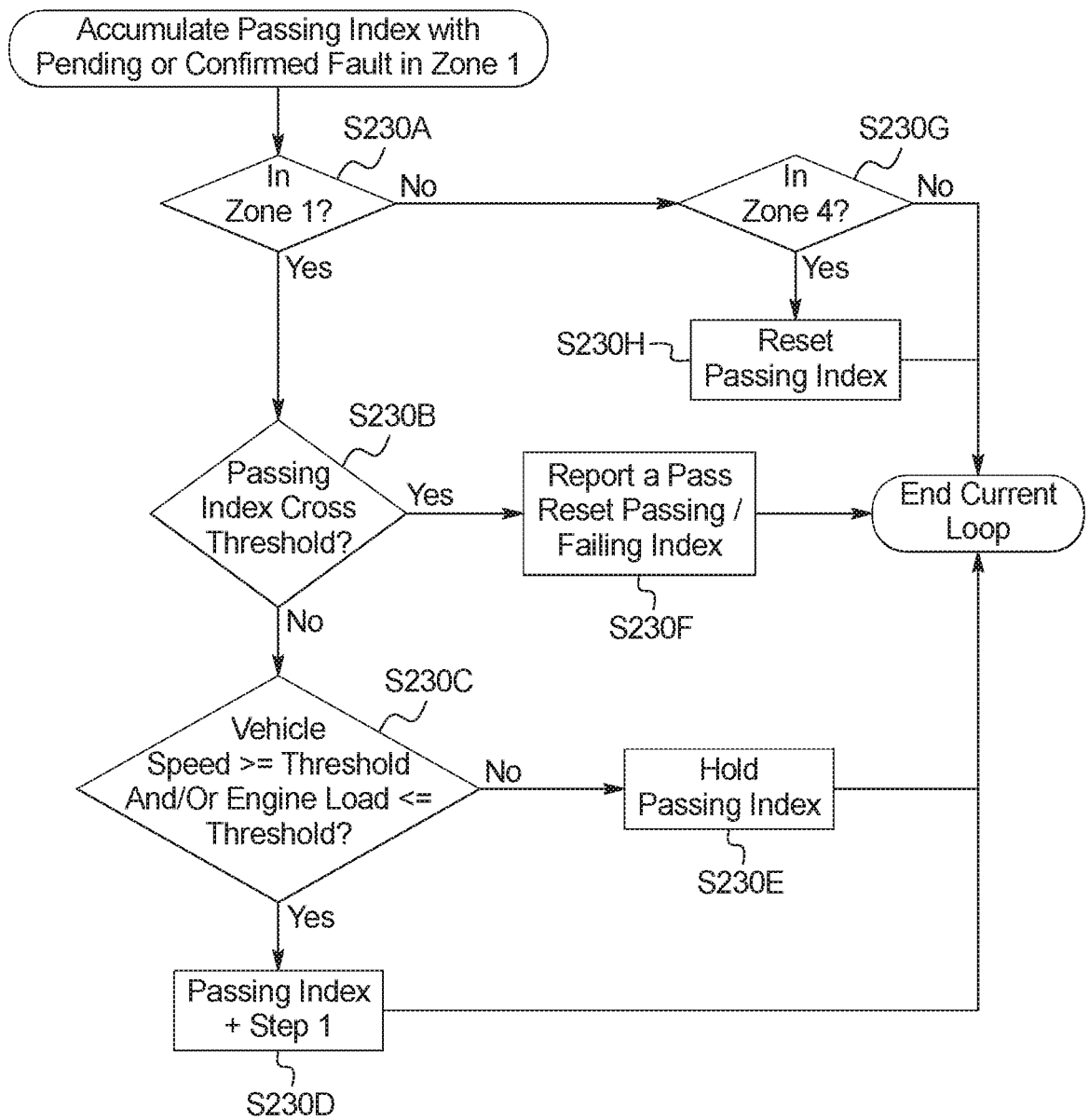
FIG. 14 is a flow chart illustrating the process of the accumulation of the passing index with a pending or confirmed fault in Zone 1.

FIG. 14 is a flow chart illustrating the process of the accumulation of the passing index with a pending or confirmed fault in Zone 1, i.e., step S230. First in step 230A, the controller 14 determines whether the ECT reading is in Zone 1. If the ECT reading is in Zone 1, the controller 14 determines whether the passing index crosses a threshold in step S230B. If the threshold has not been passed, in step S260C, the controller 14 determines whether the vehicle speed is greater than or equal to a threshold and/or whether the engine load is less than or equal to a threshold. If the vehicle speed is greater than or equal to a threshold and/or whether the engine load is less than or equal to a threshold, the passing index is increased by plus one step in step S230D. If the vehicle speed is not greater than or equal to a threshold and/or the engine load is not less than or equal to a threshold, the passing index is held in step 230E and the current loop is ended. If the passing index does cross a threshold, a pass is reported in step S230F and the failing and/or passing index is reset, and the current loop is ended. If in step S230A, the ECT reading is not in Zone 1, the controller 14 determines whether the ECT reading is in Zone 4 in step S230G. If the ECT reading is not in Zone 4, the current loop is ended. If the ECT reading is in Zone 4, the controller 14 resets the passing index in S260H and the current loop is ended.

Figure 15:
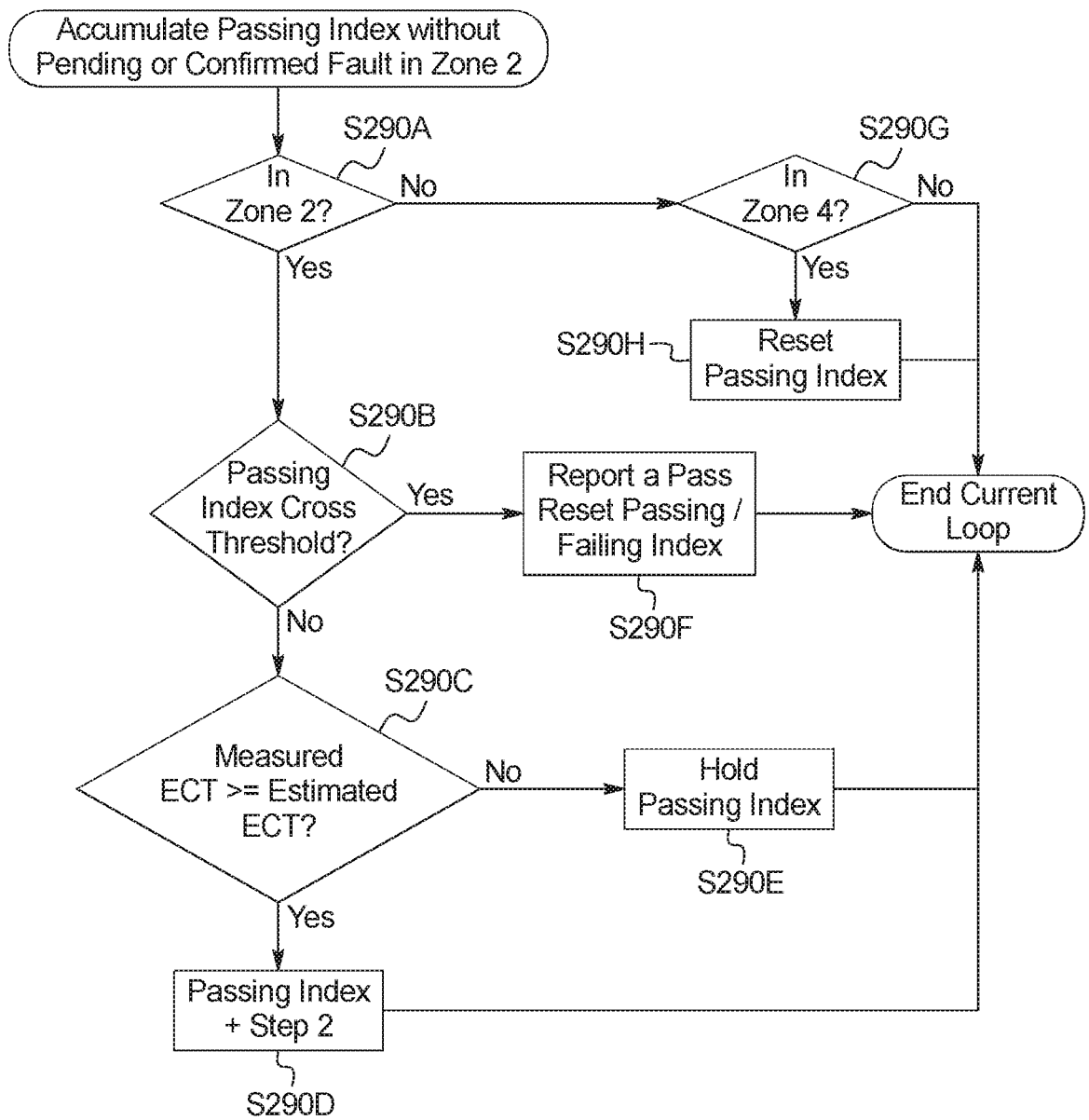
FIG. 15 is a flow chart illustrating the process of the accumulation of the passing index without pending of confirmed fault in Zone 2.

FIG. 15 is a flow chart illustrating the process of the accumulation of the passing index without pending of confirmed fault in Zone 2, i.e., step S290. First in step 290A, the controller 14 determines whether the ECT reading is in Zone 2. If the ECT reading is in Zone 2, the controller 14 determines whether the passing index crosses a threshold in step S290B. If the threshold has not been passed, in step S290C, the controller 14 compares the ECT reading (the measured ECT) to the estimated ECT (the ECT from a predetermined model). If the measured ECT is greater than or equal to the estimated ECT, the passing index is increased by a predetermined step in step S290D, and the current loop is ended. If the measured ECT is less than the estimated ECT, the passing index is held in step S290E, and the current loop is ended. If the passing index does cross a threshold, a pass is reported in step S260F and the failing and/or passing index is reset, and the current loop is ended. If in step S260A, the ECT reading is not in Zone 1, the controller 14 determines whether the ECT reading is in Zone 4 in step S260G. If the ECT reading is not in Zone 4, the current loop is ended. If the ECT reading is in Zone 4, the controller 14 resets the passing index in S260H and the current loop is ended.

Figure 16A:
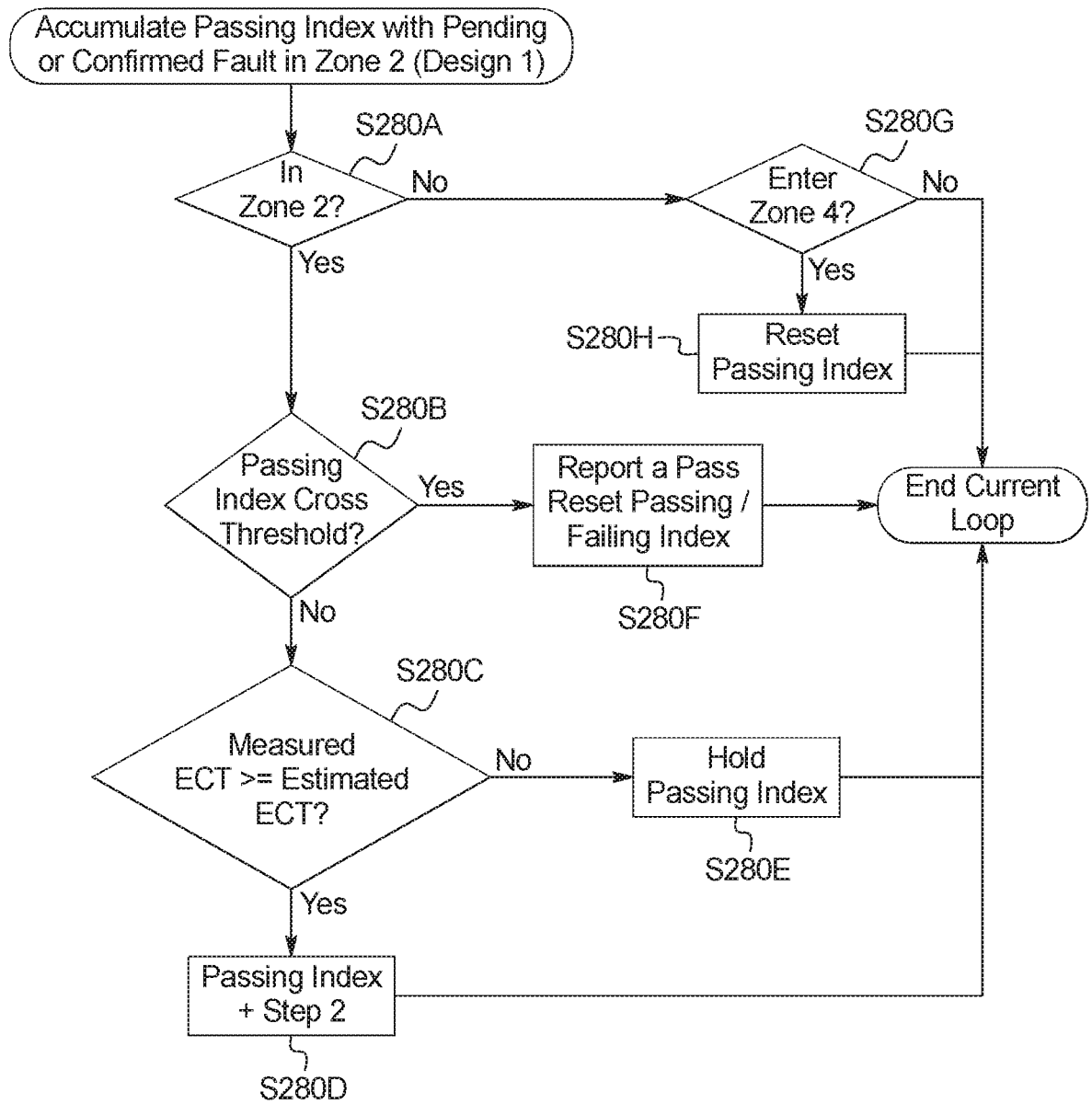
FIG. 16A is a flow chart illustrating the process of the accumulation of the passing index with a pending or confirmed fault in Zone 2.

FIG. 16A is a flow chart illustrating the process of the accumulation of the passing index with a pending or confirmed fault in Zone 2, i.e., step S280. First in step 280A, the controller 14 determines whether the ECT reading is in Zone 2. If the ECT reading is in Zone 2, the controller 14 determines whether the passing index crosses a threshold in step S280B. If the threshold has not been passed, the controller 14 compares the ECT reading (the measured ECT) to the estimated ECT (the ECT from a predetermined model) in step S280C. If the measured ECT is greater than or equal to the estimated ECT, the passing index is increased by a predetermined step in step S280D, and the current loop is ended. If the measured ECT is less than the estimated ECT, the passing index is held in step S280E, and the current loop is ended. If the passing index does cross a threshold in step S280B, a pass is reported in step S280F and the failing and/or passing index is reset, and the current loop is ended. If in step S280A, the ECT reading is not in Zone 2, the controller 14 determines whether the ECT reading is in Zone 4 in step S280G. If the ECT reading is not in Zone 4, the current loop is ended. If the ECT reading is in Zone 4, the controller 14 resets the passing index in S260H and the current loop is ended.

Figure 16B:
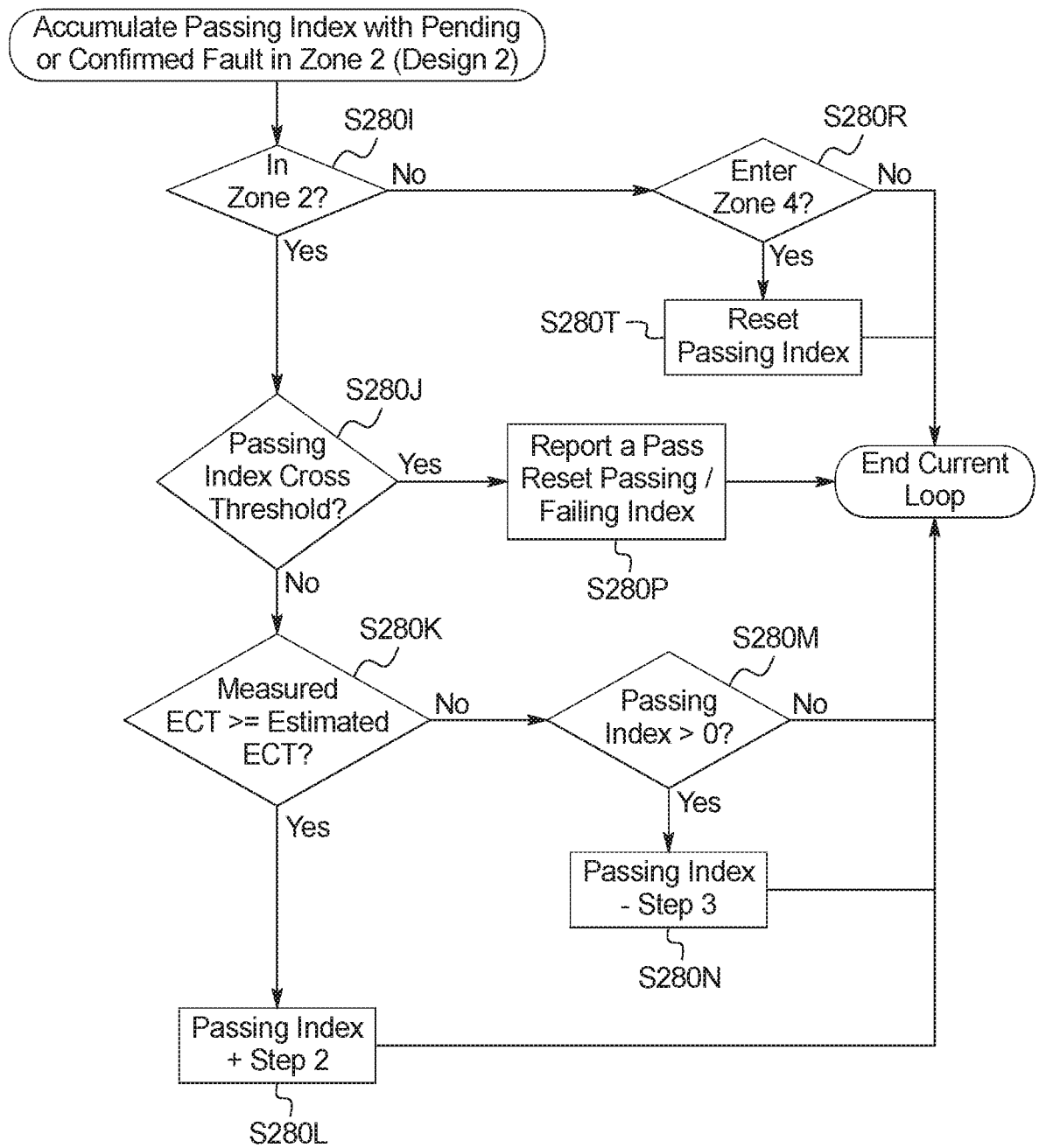
FIG. 16B is a flow chart illustrating a second embodiment for the process of the accumulation of the passing index with a pending or confirmed fault in Zone 2.

FIG. 16B is a flow chart illustrating a second embodiment for the process of the accumulation of the passing index with a pending or confirmed fault in Zone 2, i.e., step S280. First in step 280I, the controller 14 determines whether the ECT reading is in Zone 2. If the ECT reading is in Zone 2, the controller 14 determines whether the passing index crosses a threshold in step S280J. If the threshold has not been passed, the controller 14 compares the ECT reading (the measured ECT) to the estimated ECT (the ECT from a predetermined model) in step S280K. If the measured ECT is greater than or equal to the estimated ECT, the passing index is increased by a predetermined step in step S280L, and the current loop is ended. If the measured ECT is less than the estimated ECT, the controller 14 determines whether the pass index is greater than 0 in step S280M. if the passing index is not greater than 0, the current loop is ended. If the passing index is greater than zero, the passing index is reduced by a predetermined index (e.g., step 3) in step S280N, and the current loop is ended. If the passing index does cross a threshold in step S280J, a pass is reported in step S280P and the failing and/or passing index is reset, and the current loop is ended. If in step S280I, the ECT reading is not in Zone 2, the controller 14 determines whether the ECT reading is in Zone 4 in step S280R. If the ECT reading is not in Zone 4, the current loop is ended. If the ECT reading is in Zone 4, the controller 14 resets the passing index in S260T and the current loop is ended.

Figure 17:
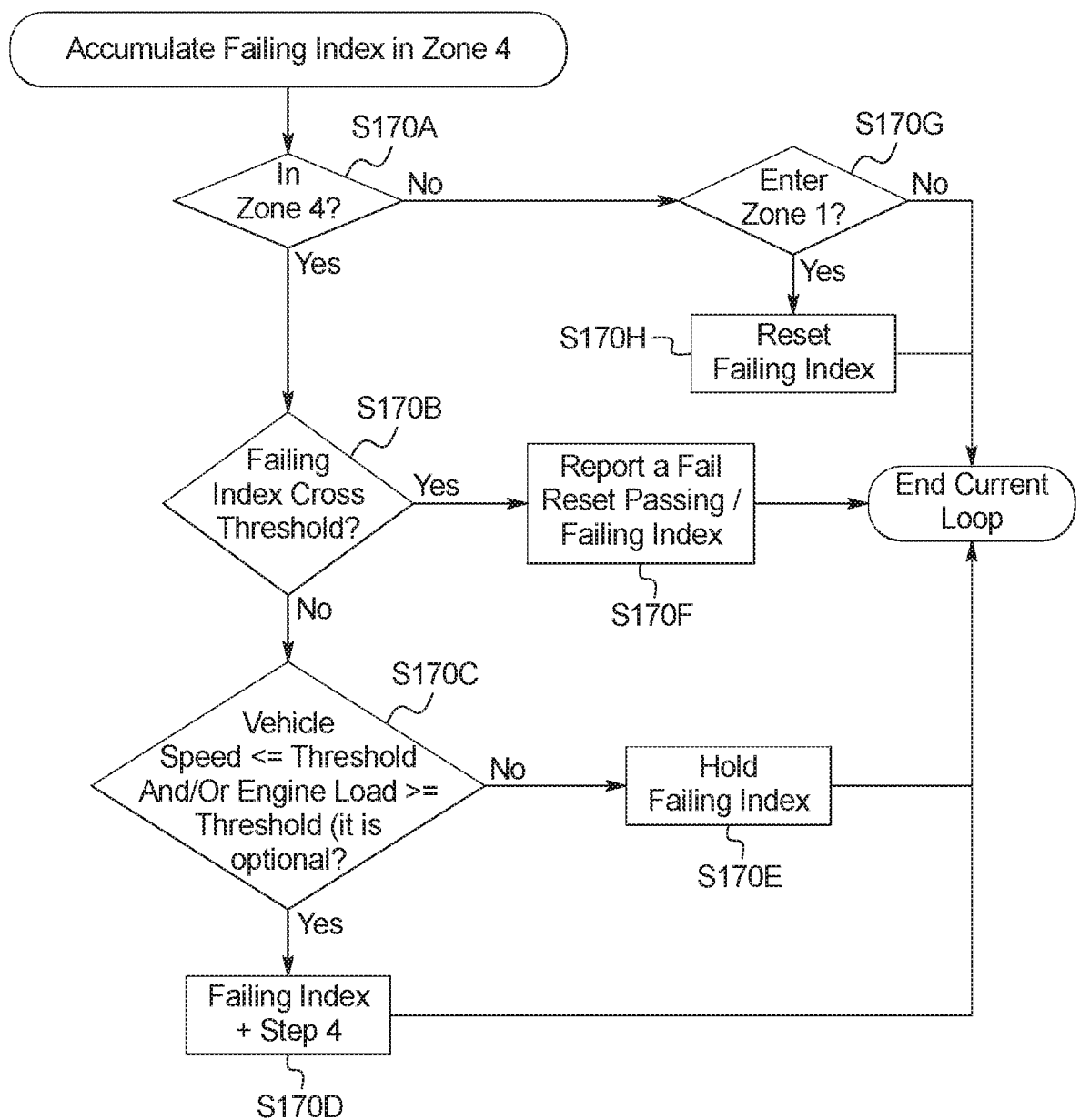
FIG. 17 is a flow chart illustrating the process of the accumulation of the failing index in Zone 4.

FIG. 17 is a flow chart illustrating the process of the accumulation of the failing index in Zone 4, i.e., step S170. First in step 170A, the controller 14 determines whether the ECT reading is in Zone 4. If the ECT reading is in Zone 4, the controller 14 determines whether the passing index crosses a threshold in step S170B. If the threshold has not been crossed, in step S170C, the controller 14 determines whether the vehicle speed is less than or equal to a threshold and/or optionally whether the engine load is greater than or equal to a threshold. If the vehicle speed is less than or equal to a threshold and/or the engine load is greater than or equal to the threshold, the passing index is increased by a predetermined step in step S170D. If the vehicle speed is greater than or equal to a threshold and/or the engine load is not less than or equal to a threshold, the passing index is held in step S170E and the current loop is ended. If the passing index does cross a threshold, a fail is reported in step S170F and the failing and/or passing index is reset, and the current loop is ended. If in step S170A, the ECT reading is not in Zone 4, the controller 14 determines whether the ECT reading is in Zone 1 in step S170G. If the ECT reading is not in Zone 1, the current loop is ended. If the ECT reading is in Zone 1, the controller 14 resets the passing index in S170H and the current loop is ended.

Figure 18A:
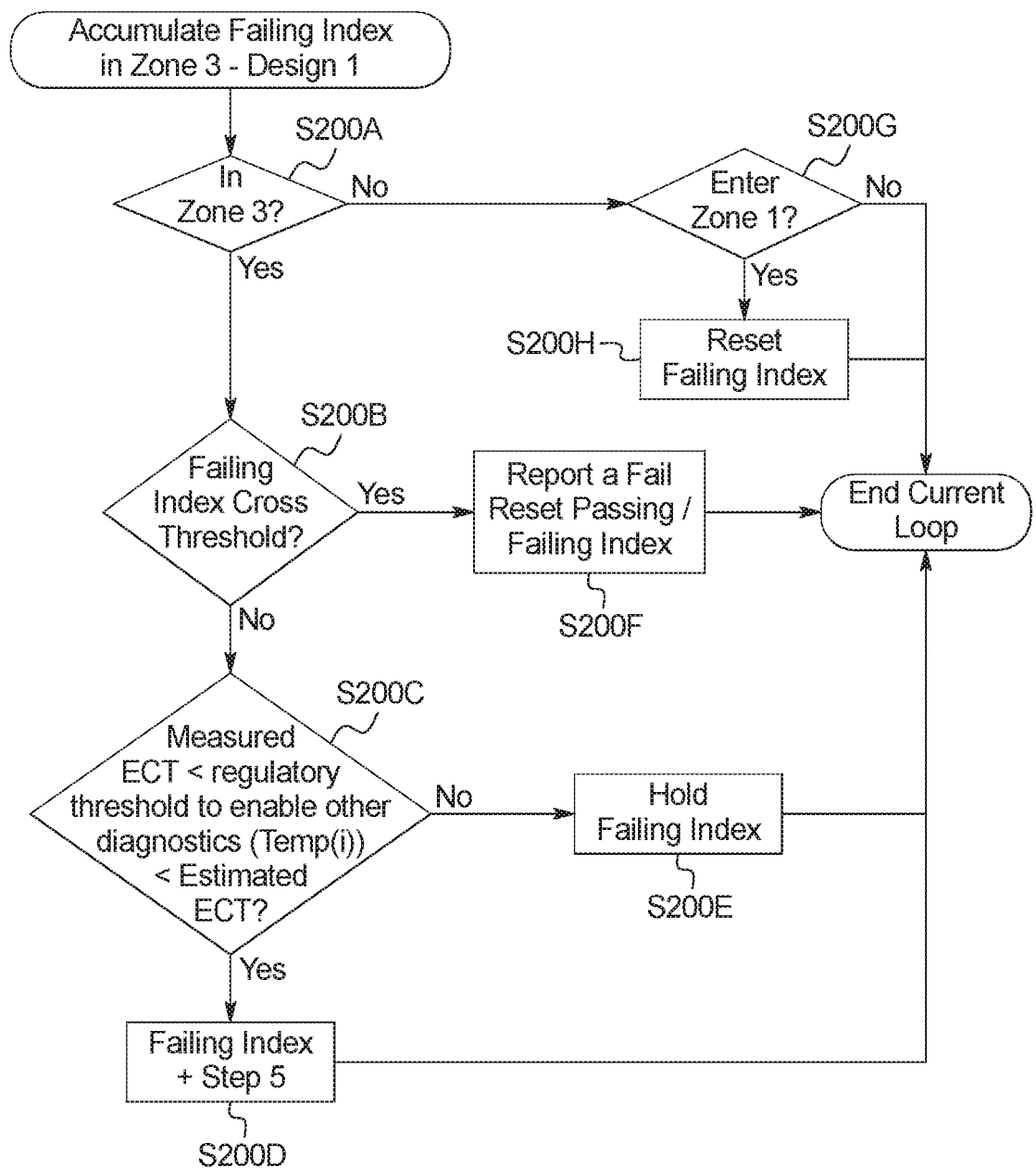
FIG. 18A is a flow chart illustrating the process of the accumulation of the failing index in Zone 3.

FIG. 18A is a flow chart illustrating the process of the accumulation of the failing index in Zone 3, i.e., step S200.

First in step 200A, the controller 14 determines whether the ECT reading is in Zone 3. If the ECT reading is in Zone 3, the controller 14 determines whether the passing index crosses a threshold in step S200B. If the threshold has not been crossed, in step S200C, the controller 14 determines whether the ECT reading (measured ECT) is less than a regulated threshold to enable other diagnostics (e.g., is Temp i less than the estimated temp). If the ECT reading (measured ECT) is less than a regulated threshold, the failing index is increased by a predetermined step in step S200D. If the ECT reading (measured ECT) is less than a regulated threshold, the passing index is held in step S200E and the current loop is ended. If the passing index does cross a threshold, a fail is reported in step S200F and the failing and/or passing index is reset, and the current loop is ended. If in step S200A, the ECT reading is not in Zone 3, the controller 14 determines whether the ECT reading is in Zone 1 in step S200G. If the ECT reading is not in Zone 1, the current loop is ended. If the ECT reading is in Zone 1, the controller 14 resets the passing index in S200H and the current loop is ended.

Figure 18B:
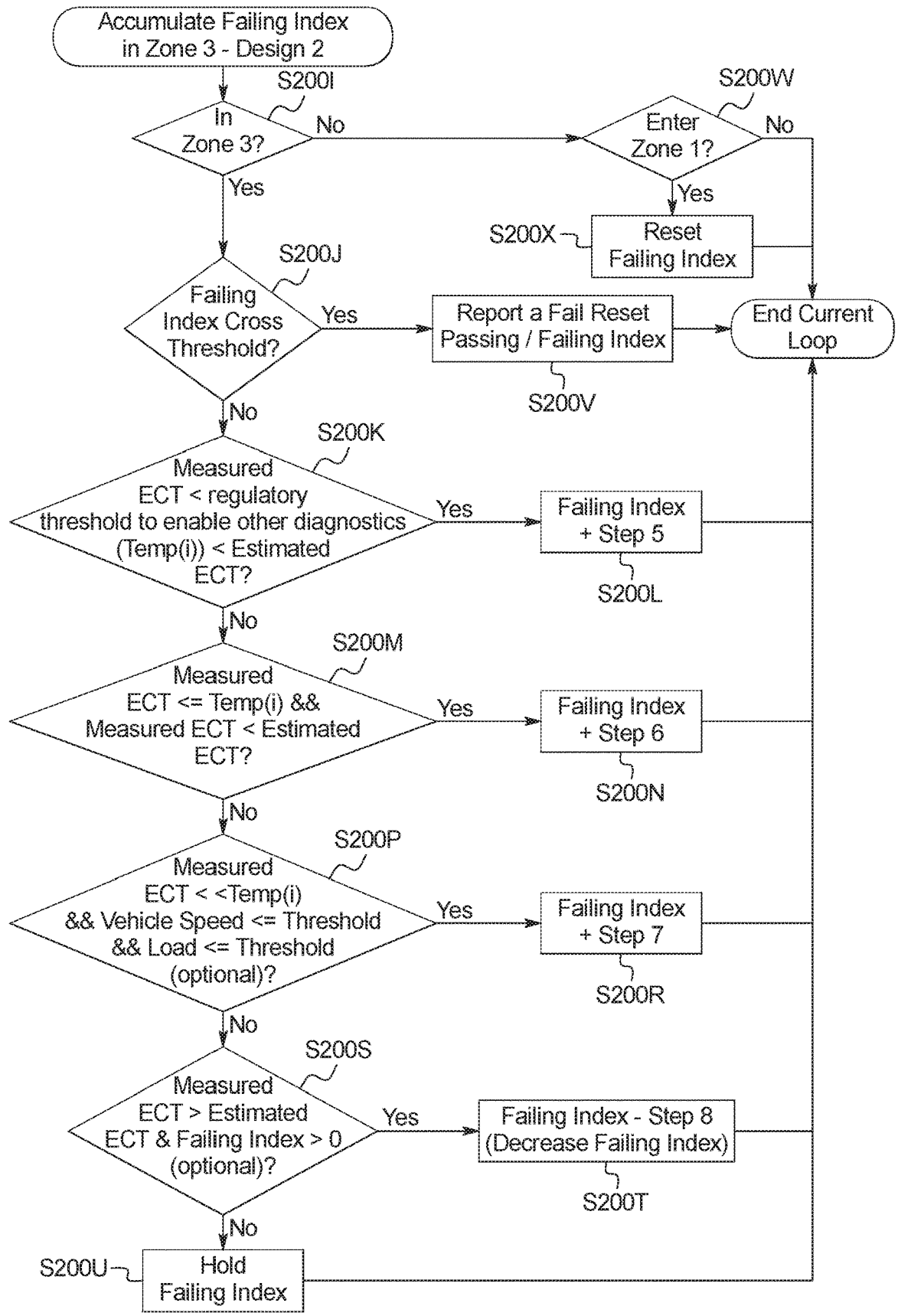
FIG. 18B is a flow chart illustrating a second process of the accumulation of the failing index in Zone 3.

FIG. 18B is a flow chart illustrating a second process of the accumulation of the failing index in Zone 3, i.e., step S200. First in step 200I, the controller 14 determines whether the ECT reading is in Zone 3. If the ECT reading is in Zone 3, the controller 14 determines whether the passing index crosses a threshold in step S200J. If the threshold has not been crossed, in step S200J, the controller 14 determines whether the ECT reading (measured ECT) is less than a regulated threshold to enable other diagnostics (e.g., is Temp i less than the estimated temp) in step S200K. If the ECT reading (measured ECT) is less than a regulated threshold, the failing index is increased by a predetermined step in step S200L and the current loop is ended. If the ECT reading (measured ECT) is less than a regulated threshold, the controller 14 determines whether the ECT reading (measured ECT) is less than or equal to the first predetermined temperature and less than an estimated (model ECT) in step S200M. If the ECT reading (measured ECT) is less than or equal to the first predetermined temperature and less than an estimated (model ECT) the failing index is incremented by a predetermined amount in step S200N, and the current loop is ended. If the ECT reading (measured ECT) is not less than or equal to the first predetermined temperature and not less than an estimated (model ECT), the controller 14 determines whether the ECT reading is less than the first predetermined temperature and whether a vehicle speed and less than or equal to a speed threshold and whether the engine load is less than or equal to a load threshold, in step S200P. If the ECT reading is less than the first predetermined temperature and a vehicle speed is less than or equal to a speed threshold and the engine load is less than or equal to a load threshold, the failing index is increased by a predetermined amount in step S200R and the current loop is ended. If the ECT reading is not less than the first predetermined temperature and the vehicle speed is not less than or equal to the speed threshold and the engine load is not less than or equal to a load threshold, the controller 14 determines whether the ECT reading is greater than the estimated (model) ECT and whether the failing index is greater than 0 in step S200S. If the ECT reading is greater than the estimated (model) ECT and the failing index is greater than 0, the failing index is decreased by a predetermined step (a decrease in the failing index) in step S200T and the current loop is ended. If the ECT reading is not greater than the estimated (model) ECT and the failing index is not greater than 0, the failing index is held in step S200U. If the passing index does cross a threshold, a fail is reported in step S200V and the failing and/or passing index is reset, and the current loop is ended. If in step S200H, the ECT reading is not in Zone 3, the controller 14 determines whether the ECT reading is in Zone 1 in step S200W. If the ECT reading is not in Zone 1, the current loop is ended. If the ECT reading is in Zone 1, the controller 14 resets the passing index in S200X and the current loop is ended.

The sensor 12, the thermostat 20 and the display device 16 are conventional components that are well known in the art. Since exhaust sensor 12, the thermostat 20 and the display device 16 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part" or "element" when used in the singular can have the dual meaning of a single part or a plurality of parts. Also as used herein to describe the above embodiment(s), the following directional terms "above", "downward", and "below" as well as any other similar directional terms refer to those directions of a vehicle equipped with the thermostat monitoring system 10 and method.

Accordingly, these terms, as utilized to describe the present invention should be interpreted relative to a vehicle equipped with the thermostat monitoring system 10 and method.

The term "detect" as used herein to describe an operation or function carried out by a component, a section, a device or the like includes a component, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A thermostat monitoring method, comprising:
   measuring an engine coolant temperature with an engine coolant temperature sensor a predetermined amount of time after engine startup;
   comparing, with a controller, the engine coolant temperature to determine whether the engine coolant temperature has met a predetermined threshold;
   when the engine coolant temperature has met the predetermined threshold, measuring a plurality of engine coolant temperatures with the engine coolant temperature sensor;
   comparing with the controller each of the plurality of engine coolant temperatures with a corresponding predetermined temperature model;
   increasing a passing index with the controller for each of the plurality of engine coolant temperatures that is greater than the corresponding predetermined temperature model and reducing the passing index for each of the plurality of engine coolant temperatures that is less than the corresponding predetermined temperature model; and
   determining with the controller whether the thermostat has failed previously, when the controller determines that the thermostat has failed previously a first increment is used for the increasing, and when the controller determines that the thermostat has not failed previously a second increment is used for the increasing, the second increment being different from the first increment.

2. The method of claim 1, further comprising
   when a predetermined number of each of the plurality of engine coolant temperatures is greater than the corresponding predetermined temperature model, determining that the thermostat has passed.

3. The method of claim 2, further comprising
   resetting a pass/fail counter.

4. The method of claim 1, further comprising
   when a predetermined number of each of the plurality of engine coolant temperatures is less than the corresponding predetermined temperature model, determining that the thermostat has failed.

5. The method of claim 4, further comprising
   resetting a pass/fail counter.

6. The method of claim 1, wherein
   when at least some of the plurality of engine coolant temperatures are determined to be below a second predetermined threshold determining that the thermostat has failed.

7. The method of claim 1, wherein
   when at least some of the plurality of engine coolant temperatures are determined to be above a second predetermined threshold determining that the thermostat has passed.

8. A thermostat monitoring system, comprising:
   an engine coolant temperature sensor configured to measure an engine coolant temperature a predetermined amount of time after engine startup;
   a controller programmed to compare the engine coolant temperature to determine whether the engine coolant temperature has met a predetermined threshold, when the controller has determined that the engine coolant temperature has met the predetermined threshold, the controller is programmed to cause the engine coolant temperature sensor to measure a plurality of engine coolant temperatures, and the controller further programmed to compare each of the plurality of engine coolant temperatures with a corresponding predetermined temperature model, and increase a passing index for each of the plurality of engine coolant temperatures that is greater than the corresponding predetermined temperature model and reduce the passing index for each of the plurality of engine coolant temperatures that is less than the corresponding predetermined temperature model, when the controller determines that the plurality of engine coolant temperatures is less than the corresponding predetermined temperature model, the controller is programmed to reduce the passing index by a first predetermined increment, and when the controller determines that the plurality of engine coolant temperatures is less than the corresponding predetermined temperature model and a vehicle speed is less than a threshold vehicle speed, the controller is programmed to reduce the passing index by a second predetermined increment different from the first predetermined increment; and a storage device configured to store the passing index.

9. The system of claim 8, wherein the controller is programmed to determine the thermostat has failed when a predetermined number of each of the plurality of engine coolant temperatures is less than the corresponding predetermined temperature model and cause a fail indicator to be activated.

10. The system of claim 8, wherein the controller is programmed to determine the thermostat has failed when at least some of the plurality of engine coolant temperatures are determined to be below a second predetermined threshold and cause a fail indicator to be activated.

11. A thermostat monitoring system, comprising:

an engine coolant temperature sensor configured to measure an engine coolant temperature a predetermined amount of time after engine startup;

a controller programmed to compare the engine coolant temperature to determine whether the engine coolant temperature has met a predetermined threshold, when the controller has determined that the engine coolant temperature has met the predetermined threshold, the controller is programmed to cause the engine coolant temperature sensor to measure a plurality of engine coolant temperatures, and the controller further programmed to compare each of the plurality of engine coolant temperatures with a corresponding predetermined temperature model, increase a passing index for each of the plurality of engine coolant temperatures that is greater than the corresponding predetermined temperature model and reduce the passing index for each of the plurality of engine coolant temperatures that is less than the corresponding predetermined temperature model and determine whether the thermostat has failed previously, when the controller has determined that the thermostat has failed previously, the controller is programmed to use a first increment for increasing the passing index, and when the controller has determined that the thermostat has not failed previously the controller is programmed to use a second increment for increasing the passing index, the second increment being different from the first increment; and a storage device configured to store the passing index.

12. A thermostat monitoring system, comprising:

an engine coolant temperature sensor configured to measure an engine coolant temperature a predetermined amount of time after engine startup;

a controller programmed to compare the engine coolant temperature to determine whether the engine coolant temperature has met a predetermined threshold, when the controller has determined that the engine coolant temperature has met the predetermined threshold, the controller is programmed to cause the engine coolant temperature sensor to measure a plurality of engine coolant temperatures, and the controller further programmed to compare each of the plurality of engine coolant temperatures with a corresponding predetermined temperature model, and increase a passing index for each of the plurality of engine coolant temperatures that is greater than the corresponding predetermined temperature model or reduce the passing index for each of the plurality of engine coolant temperatures that is less than the corresponding predetermined temperature model, and when the controller determines that the plurality of engine coolant temperatures is less than the corresponding predetermined temperature model, the controller is programmed to reduce the passing index by a first predetermined increment, and when the controller determines that the plurality of engine coolant temperatures is less than the corresponding predetermined temperature model and a vehicle speed is less than a threshold vehicle speed, the controller is programmed to reduce the passing index by a second predetermined increment different from the first predetermined increment; and a storage device configured to store the passing index.

\* \* \* \* \*